(12) United States Patent
Nada et al.

(10) Patent No.: US 10,538,272 B2
(45) Date of Patent: Jan. 21, 2020

(54) VEHICLE

(71) Applicant: Kubota Corporation, Osaka-shi (JP)

(72) Inventors: Koji Nada, Sakai (JP); Hiroki Bessho, Sakai (JP); Sechan Park, Sakai (JP); Masaru Nakaji, Sakai (JP)

(73) Assignee: Kubota Corporation, Osaka (JP)

( * ) Notice: Subject to any disclaimer, the term of this patent is extended or adjusted under 35 U.S.C. 154(b) by 14 days.

(21) Appl. No.: 15/837,309

(22) Filed: Dec. 11, 2017

(65) Prior Publication Data

US 2018/0297641 A1 Oct. 18, 2018

(30) Foreign Application Priority Data

Apr. 17, 2017 (JP) ................................. 2017-081390
Jun. 1, 2017 (JP) ................................. 2017-109381
Jun. 1, 2017 (JP) ................................. 2017-109382

(51) Int. Cl.
| | | |
|---|---|---|
| B60R 21/13 | (2006.01) | |
| B60R 21/06 | (2006.01) | |
| B60R 21/02 | (2006.01) | |
| B60N 3/02 | (2006.01) | |
| B62D 25/06 | (2006.01) | |
| B60R 16/04 | (2006.01) | |
| B60Q 1/04 | (2006.01) | |

(52) U.S. Cl.
CPC ............ B62D 25/06 (2013.01); B60N 3/02 (2013.01); B60Q 1/0483 (2013.01); B60R 16/04 (2013.01); B60R 21/06 (2013.01); B60R 21/131 (2013.01); B60R 2021/0246 (2013.01)

(58) Field of Classification Search
CPC ....... B60R 21/13; B60R 21/131; B60R 21/06; B60R 2021/028; B60R 2021/0018; B60R 2021/0246; B62D 33/0625; B62D 33/0617; B60N 3/02
See application file for complete search history.

(56) References Cited

U.S. PATENT DOCUMENTS

| | | | |
|---|---|---|---|
| 8,464,824 B1 * | 6/2013 | Reisenberger | B60K 28/10 180/268 |
| 8,479,854 B1 * | 7/2013 | Gagnon | B60K 26/04 180/68.3 |
| 10,189,428 B1 * | 1/2019 | Sellars | B60R 19/34 |
| 2012/0055728 A1 | 3/2012 | Bessho et al. | |
| 2013/0168178 A1 * | 7/2013 | Takagi | B60K 5/06 180/291 |
| 2014/0144719 A1 * | 5/2014 | Morgan | B60K 1/00 180/65.31 |
| 2014/0265285 A1 * | 9/2014 | Erspamer | B60N 2/6009 280/783 |

(Continued)

FOREIGN PATENT DOCUMENTS

| | | |
|---|---|---|
| JP | 1277894 A | 11/1989 |
| JP | 8264005 A | 10/1996 |

(Continued)

*Primary Examiner* — Gregory A Blankenship
(74) *Attorney, Agent, or Firm* — The Webb Law Firm

(57) ABSTRACT

A multi-purpose vehicle includes a rollover protection structure frame (ROPS frame) associated with a seat. The ROPS frame includes right and left front struts, and right and left rear struts. A handrail frame is attached to a lateral outer side of the seat. A cover member is attached to the handrail frame and extends upwards from the handrail frame.

7 Claims, 20 Drawing Sheets

(56) References Cited

U.S. PATENT DOCUMENTS

| | | | |
|---|---|---|---|
| 2015/0041237 A1* | 2/2015 | Nadeau | B60K 5/00 180/292 |
| 2015/0047917 A1* | 2/2015 | Burt, II | B62D 25/2036 180/292 |
| 2015/0175114 A1* | 6/2015 | Schroeder | B60R 21/06 296/190.03 |
| 2015/0197208 A1* | 7/2015 | Johnson | B60R 21/13 280/801.2 |
| 2015/0266386 A1* | 9/2015 | Matsuda | B60L 11/1803 318/139 |
| 2016/0229366 A1* | 8/2016 | Witt | B60R 21/06 |
| 2016/0311295 A1* | 10/2016 | Wilson, III | B60J 5/0487 |
| 2017/0001549 A1 | 1/2017 | Bessho et al. | |
| 2017/0028881 A1* | 2/2017 | Proulx | B60N 2/305 |
| 2017/0029035 A1* | 2/2017 | Dube | B60K 15/063 |
| 2017/0029036 A1* | 2/2017 | Proulx | B60N 2/24 |
| 2017/0174027 A1* | 6/2017 | Mailhot | B62D 23/005 |
| 2017/0174069 A1* | 6/2017 | Oyama | B60K 6/52 |
| 2017/0203639 A1* | 7/2017 | Deckard | B60J 5/0487 |
| 2017/0246942 A1* | 8/2017 | Takaki | B60K 1/04 |
| 2017/0247058 A1* | 8/2017 | Hokes | B60R 21/13 |
| 2017/0267198 A1* | 9/2017 | Gordon | B60R 21/06 |
| 2018/0178857 A1* | 6/2018 | Moffitt | B60Q 3/76 |
| 2018/0297641 A1* | 10/2018 | Nada | B60Q 1/0433 |

FOREIGN PATENT DOCUMENTS

| | | |
|---|---|---|
| JP | 201251507 A | 3/2012 |
| JP | 201713686 A | 1/2017 |

* cited by examiner

VEHICLE

CROSS REFERENCE TO RELATED APPLICATIONS

This application claims priority to Japanese Patent Application No. 2017-081390 filed Apr. 17, 2017, and Japanese Patent Application Nos. 2017-109381 and 2017-109382, both filed Jun. 1, 2017, respectively, the disclosures of which are hereby incorporated in their entirety by reference.

BACKGROUND OF THE INVENTION

1. Field of the Invention

This invention relates to a vehicle, more particularly to a multi-purpose vehicle. But, the invention is not limited thereto.

2. Description of the Related Art (1) First Related Art

A multi-purpose vehicle has its utility in transportation of persons and/or load, a recreational activity, etc. In a multi-purpose vehicle disclosed in JP 2012-051507 A (or US 2012/0055728 A1 corresponding thereto), a seat is provided between front wheels and rear wheels; and a load carrying platform is provided rearwardly of the seat. A rollover protection structure frame (ROPS frame) is provided to surround the seat, and a handrail frame is provided on a lateral outer side of the seat. The ROPS frame includes right and left front struts and right and left rear struts.

In recent years, in accordance with speeding-up of the multi-purpose vehicle, there arises a need for providing a cover body on a lateral outer side of the seat, in addition to the ROPS frame and the handrail frame. Then, there is a need for a supporting arrangement of the cover body having high productivity.

(2) Second Related Art

A headlight assembly mounting apparatus of a vehicle is configured such that a pair of right and left lamp units are attached via a pair of right and left attaching plates to a body member disposed at a front portion of a hood of the vehicle.

In JP 1-277894 A, a pair of right and left lamp units are attached to the body via a signal attaching plate. The body and the attaching plate, and the attaching plate and the respective lamp unit, are connected respectively to be capable of adjusting the optical axis via an aiming device.

With the arrangement of JP1-277894A, general position adjustments of the right and left lamp units can be readily effected simultaneously. However, since the single attaching plate relative to the body is configured to adjust the optical axis about a pivot adjacent its end portion, the span of supporting the attaching plate relative to the body tends to be considerably long in order to stride over the pair of right and left lamp units, so that it is difficult to secure sufficient support strength of the attaching plate relative to the body. For this reason, there is a need to improve the strength of the attaching plate per se and also to improve the strength of the supporting portion relative to the body, thus tending to invite overall enlargement.

On the other hand, in JP 8-264005 A, a pair including a head lamp and a fog lamp together constitutes a right/left lamp unit pair. Each lamp unit is connected to a lamp body via a pair of aiming screws and a ball joint. Connecting positions of the two aiming screws and the ball joint in each lamp unit are set at three positions around an optical axis of the lamp unit. Specifically, the three connecting positions are set to include two, upper and lower positions between adjacent right/left lamp units (between adjacent end portions of the two lamp units) and one position at a portion away from the adjacent end portions.

In the case of JP 8-264005 A wherein the lamp unit and the lamp body are directly connected to each other, the strength of the headlight as a whole relies on the body only. For this reason, in order to ensure high strength for the headlight as a whole, for its reinforcement, it is necessary to mold the body per se, comprised of resin mold product providing high molding freedom, into a complicated shape; or, it is necessary to provide the body with some additional member for its reinforcement. For this reason, the arrangement would invite cost increase or complexity of arrangement due to the complexity of the body shape or the addition of the reinforcing member.

Further, with the above arrangement, the three connecting positions are set to include two, upper and lower positions between adjacent right/left lamp units (between adjacent end portions of the two lamp units) and one position at a portion away from the adjacent end portions. For this reason, the connecting positions between adjacent end portions of the two lamp units require a space for e.g. adjustment operations at these connecting portions. Hence, there inevitably arises a need for disposing the adjacent end portions with a large distance therebetween.

In view of the above, there is a need for an arrangement that can ensure good working efficiency and sufficient attaching strength, while avoiding enlargement of the headlight mounting apparatus.

(3) Third Related Art

In a multi-purpose vehicle (an example of a "work vehicle") disclosed in JP 2017-013686 A (or US 2017/0001549A1 corresponding thereto), a battery is mounted on a supporting platform at a vehicle body lateral portion between front wheels and rear wheels, and is supported with its position being fixed by means of bar-like connecting members provided on right and left opposed sides.

The above arrangement is advantageous in that the battery can be supported by a simple supporting arrangement so as to facilitate maintenance operations such as checking, replacement, etc. of the battery. On the other hand, since connecting terminals for power outlet are exposed to the outside on the upper face of the battery, muddy water, rainwater, etc. may be splashed over the top of the battery. So that, there remains room for improvement in view of early corrosion tendency of the connecting terminal.

Namely, there is a need for preventing adhesion of water to the connecting terminal of the battery.

SUMMARY OF THE INVENTION (1) In view of First Related Art, there is proposed a multi-purpose vehicle as under.

A multi-purpose vehicle comprising:
front wheels and rear wheels;
a seat provided between the front wheels and the rear wheels;
a platform provided rearwardly of the seat;
a rollover protection structure frame (ROPS frame) associated with the seat, the ROPS frame including right and left front struts, and right and left rear struts;
a handrail frame provided on a lateral outer side of the seat; and
a cover member attached to the handrail frame and extending upwards from the handrail frame.

With this arrangement, since the handrail frame is a relatively small structure, even with attachment of the cover member to the handrail frame, the integral unit of these handrail frame and the cover member is also a relatively small structure. Even if the cover member is attached to the handrail frame in advance, the handrail frame and the cover member can be handled relatively easily as one structure.

Thus, e.g. in the case of a production process wherein after attachment of the cover member to the handrail frame in advance, the structure of the handrail frame and the cover member is attached to the vehicle body, the attaching work can be carried out easily and improvement of the production efficiency can be realized.

In one preferred embodiment, the handrail frame includes a vertically oriented portion extending along a vertical direction, and a horizontally oriented portion extending along a front-rear direction; and the cover member is attached to the horizontally oriented portion and extends upwards from the horizontally oriented portion.

According to the arrangement, in view of the fact that the handrail frame often includes a vertically oriented portion and a horizontally oriented portion, with utilization of the horizontally oriented portion, it is possible to allow the cover member to extend easily upwards from the handrail frame (horizontally oriented portion).

In one preferred embodiment, the cover member includes a frame portion connected to the handrail frame and extending upwards from the handrail frame, and a cover portion having a first face portion and a second face portion that are oriented along a right-left direction and spaced apart from each other via a predetermined distance in the right-left direction; and the cover portion is attached to the frame portion with insertion of the frame portion between the first face portion and the second face portion.

According to the arrangement, for instance, the cover members will be provided on right and left lateral outer sides of the seat. And, in the right cover member, the first face portion of the cover portion is oriented toward the seat and the second face portion of the cover portion is oriented toward the lateral outer side of the seat. Whereas, in the left cover member, the second face portion of the cover portion is oriented toward the seat and the first face portion of the cover portion is oriented toward the lateral outer side of the seat.

As a different arrangement from the above, with switching over between the first face portion and the second face portion of the cover portion in the right-left direction between the right and left cover members, the right and left cover members can be arranged such that the first face portions of the cover portions are oriented toward the seat and the second face portions of the cover portions are oriented toward the lateral outer side of the seat. Similarly, it is also possible to arrange such that the first face portions of the cover portions are oriented toward the lateral outer side of the seat and the second face portions of the cover portions are oriented toward the seat.

Namely, since it is possible to employ common right and left cover members, there is achieved an advantage in the respect of production cost reduction. Further, since the frame portion is covered by the cover portion, the outer appearance of the cover member is improved.

In one preferred embodiment, the handrail frame is provided adjacent a front side of one of the right and left rear struts associated therewith; and the cover member extends upwards from the handrail frame along said one rear strut on the front side of said one rear strut.

According to the arrangement, since the cover member is disposed in close vicinity of the rear strut of the ROPS frame, it becomes easier for the cover member to provide its function of assisting the function of the ROPS frame.

(2) In view of Second Related Art, there is proposed a headlight assembly mounting apparatus for a vehicle, as under.

A headlight assembly mounting apparatus for a vehicle, the headlight assembly including right and left lamp units arranged adjacent to each other, each of the right and left lamp units having a light source, a reflector and a lens; the mounting apparatus being configured to mount the right and left lamp units to a front portion of a vehicle hood, the mounting apparatus comprising:

a body member; and right and left attaching plates, each of the attaching plates being configured to support the lamp unit associated therewith and fix the lamp unit to the body member;

wherein the right and left attaching plates are fixed to the body member to support the respective lamp units;

connecting positions of each of the lamp units to the attaching plate associated therewith are provided at three positions about an optical axis of the lamp unit; and the vertex of a virtual triangle interconnecting the three connecting positions of one of the lamp units is oriented in a direction opposite to the vertex of a virtual triangle interconnecting the three connecting positions of the other of the lamp units.

According to the above arrangement, a pair of right and left attaching plates are fixed to the body member in the right-left direction of the hood and to these attaching plates, the lamp units are attached respectively. Therefore, in comparison with an arrangement wherein the pair of right and left lamp units are supported by the body member alone, the lamp units can be readily supported in a firm manner, thanks to the cooperative actions of the respective attaching plate and the body member. Moreover, since the attaching plates are not a single attaching plate for supporting the pair of lamp units altogether, but the respective attaching plates can support the lamp units individually and respectively, the span between the supporting portions of the respective attaching plate relative to the body member can be made short, thus facilitating firm and reliable fixation therebetween.

And, the connecting positions about the optical axis of the respective lamp unit are set such that the vertex of a virtual triangle interconnecting the three connecting positions of one lamp unit is oriented in the direction opposite to the vertex of a virtual triangle interconnecting the three connecting positions of the other lamp unit. Therefore, even if the lamp units at adjacent positions are connected to the respective attaching plates, with placing the lamp units in closest possible vicinity with each other, the connecting positions of the lamp units at the adjacent positions can still be relatively distant from each other in the right-left direction, so that the front light can be readily formed compact.

In one preferred embodiment, fixing positions of each of the attaching plates to the body member are provided at three positions about the optical axis of the lamp unit associated therewith; and the vertex of a virtual triangle interconnecting the three fixing positions is oriented in a direction opposite to the vertex of the virtual triangle interconnecting the three connecting positions of the lamp unit associated therewith.

According to the arrangement, between the body member and the attaching plates also, fixing positions of the respective attaching plate relative to the body member are provided at three positions about the optical axis of the lamp unit associated therewith. And, the respective fixing positions are set such that the vertex of a virtual triangle interconnecting the fixing positions at the three portions is oriented in the direction opposite to the vertex of the virtual triangle interconnecting the three connecting positions of the lamp unit associated therewith. Therefore, these fixing positions will not interfere with the connecting positions of the lamp units to the attaching plates.

In one preferred embodiment, the headlight assembly mounting apparatus further comprises: a connecting bolt configured to connect each of the lamp units to the attaching plate associated therewith, the connecting bolt being threaded into the vehicle hood from an inner side of the vehicle hood; and a fixing bolt configured to fix each of the lamp unit to the body member, the fixing bolt being threaded into the vehicle hood from an outer side of the vehicle hood.

According to the arrangement, respecting the connection of the lamp unit to the attaching plate, prior to assembly of the headlight to the vehicle, general optical adjustment is effected in advance and then, when the headlight is to be assembled to the vehicle, fixing of the attaching plate to the body member can be effected by means of the fixing bolt which can be threaded into the vehicle hood from the outer side thereof. Therefore, the attachment of the headlight while effecting the final optical axis adjustment and the optical adjustment operation at the time of maintenance inspection can be readily carried out in an efficient manner from the wide space outside the hood.

(3) In view of Third Related Art, there is proposed a multi-purpose vehicle as under.

A work vehicle comprising:

a battery, the battery having a connecting terminal for an electric cable in its upper face;

a cover that covers the upper face of the battery, the cover and the upper face of the battery defining a passage space for the electric cable therebetween;

an elastic member provided in the passage space and configured to prevent intrusion of water while allowing passage of the electric cable; and a reinforcing rib is formed at a portion of the cover adjacent the upper face of the battery for preventing intrusion of water toward the connecting terminal.

With the above arrangement, the battery has its upper side covered by the cover. By covering the outer circumference of the upper face of the battery, the cover can prevent splashing or falling of muddy water, rainwater, etc. thereon from the outside. In the outer circumference of the upper face, at its cable passing portion where the cable is to pass, a gap formed in association with passage of the cable can be formed as small as possible with utilization of the elastic force of the elastic member, thus preventing intrusion of water.

Between the cover and the upper face of the battery, a passage space for the electric cable is needed. With the above-described arrangement, with effective utilization of the reinforcing rib for preventing deformation of the cover, such passage space for passage of the electric cable is formed and also intrusion of water toward the connecting terminal can be prevented.

Therefore, it is possible prevent adherence of water to the connecting terminal of the battery, so that the possibility of early corrosion of the connecting terminal is lessened. In one preferred embodiment, the cover has an inclined face formed on an upper outer face thereof, the inclined face extending progressively lower toward an outer circumference of the cover.

According to the arrangement, even when muddy water, rainwater or the like is splashed over, such muddy water, rainwater or the like will not stay at the cover upper portion, but may be guided to flow down along the inclined face and be eventually discharged to the outside from the outer circumferential portion of the cover.

In one preferred embodiment, the work vehicle further comprises: a platform that mounts the battery and supports the battery thereon; a pressing member that extends along one side of an outer circumferential edge of the upper face of the battery supported on the platform, the pressing member being configured to retain a corner portion of the battery that corresponds to the one side of the battery; and a pair of connecting members that extend diagonally, at opposed ends of said one side of the battery, between the pressing member and the platform to connect the pressing member to the platform; wherein the cover is connected to the pressing member.

According to the arrangement, the battery is fixedly mounted and supported to the platform by connecting the pressing member and the platform to each other via a pair of connecting members. Then, the cover will be connected to the pressing member, thus being fixed. In this way, with effective utilization of the supporting arrangement of the battery, the cover can be fixed without providing any special additional member.

(4) Further and other features and advantageous functions/effects achieved thereby will become apparent upon reading the following explanation with reference to the accompanying drawings.

DETAILED DESCRIPTION OF PREFERRED EMBODIMENTS

Unless indicated explicitly otherwise, in the front/rear direction and the right-left direction in respective embodiment, a "front" is the forward direction ("F" in FIG. 9 and FIG. 15) in the forward traveling direction at the time of vehicle traveling, and "rear" is the reverse direction ("R" in FIG. 9 and FIG. 15) in the reverse traveling direction. The direction corresponding to the right side relative to the forwardly oriented posture in the front-rear direction is "right" ("R" in FIG. 10 and FIG. 16) and the direction corresponding to the left side is "left" ("L" in FIG. 10 and FIG. 16).

First Embodiment (General Configuration of Multi-Purpose Vehicle)

Figure 1:
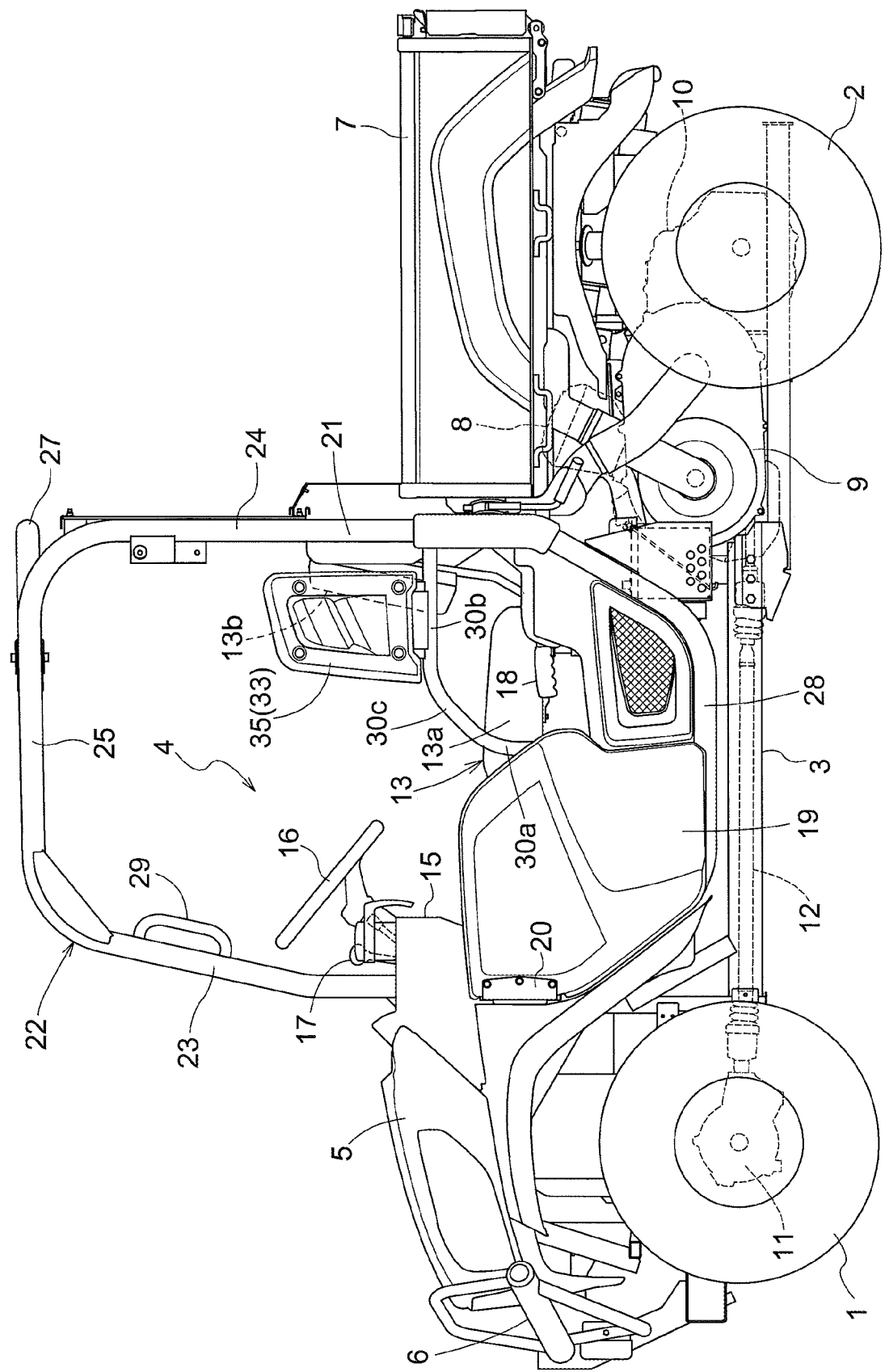
FIG. 1 is an overall side view of a multi-purpose vehicle according to a first embodiment (applied similarly to the subsequent drawings up to FIG. 8)
Figure 2:
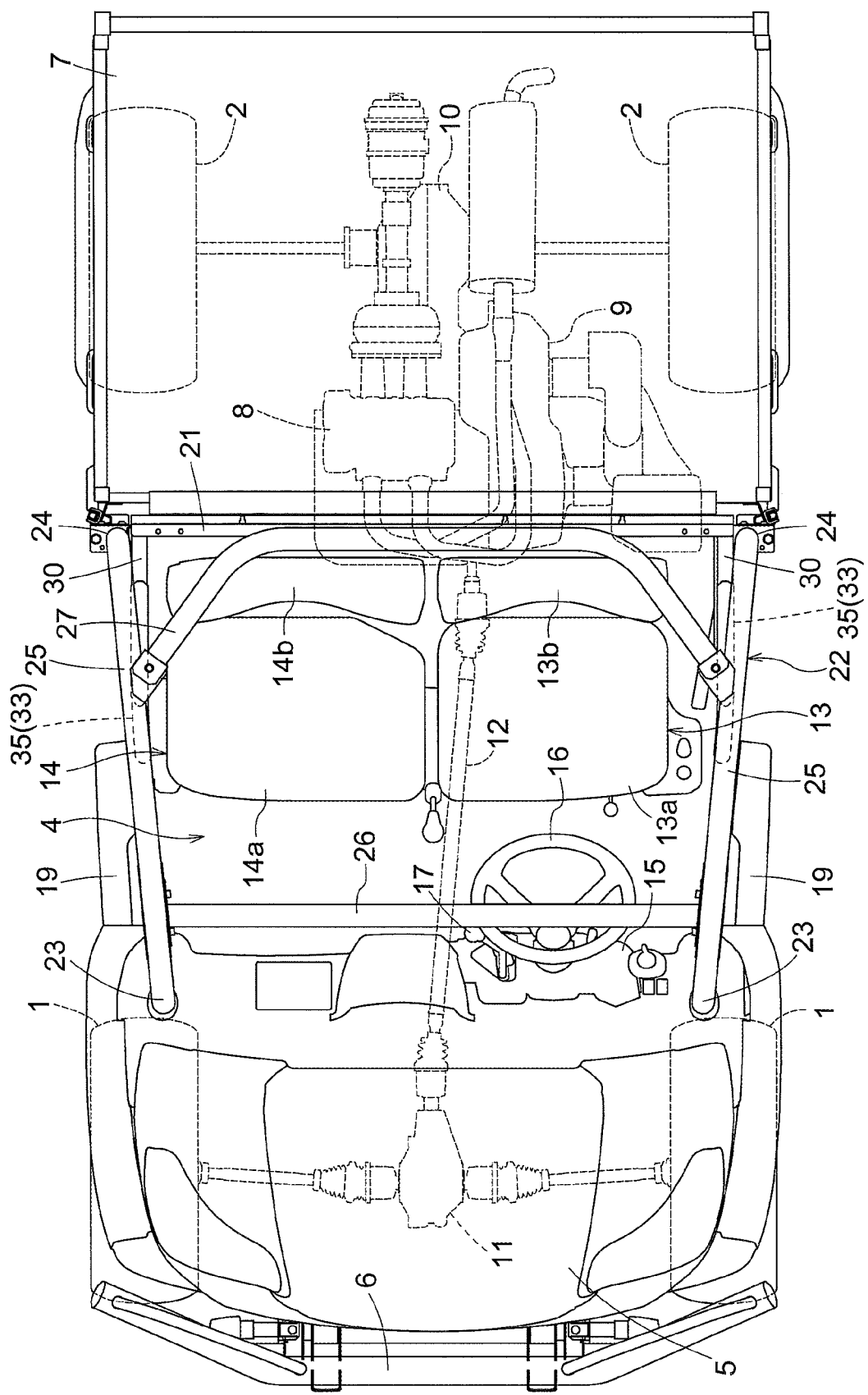
FIG. 2 is an overall plan view of the multi-purpose vehicle.

FIG. 1 and FIG. 2 show a multi-purpose vehicle in its entirety. Right and left front wheels 1 are supported at a front portion of a vehicle body frame 3, and right and left rear wheels 2 are supported at a rear portion of the vehicle body frame 3. In the vehicle body frame 3, a driving section 4 is provided between the front wheels 1 and the rear wheels 2. A hood 5 and a front bumper 6 are provided on the front side of the driving section 4, and a load-carrying platform 7 is provided on the rear side of the driving section 4.

As shown in FIG. 1 and FIG. 2, an engine 8, a belt type stepless speed changer device 9 and a transmission case 10 are provided at rear portions of the vehicle body frame 3. A front wheel differential device 11 is provided at a front portion of the vehicle body frame 3. A transmission shaft 12 is connected to/between the transmission case 10 and the front wheel differential device 11.

As shown in FIG. 1 and FIG. 2, power of the engine 8 is transmitted to the stepless speed changer device 9. The power is transmitted from the stepless speed changer device 9 to a gear speed changer device (not shown) of the transmission case 10 and a rear wheel differential device (not shown), and then to the right and left rear wheels 2. Power taken off a portion immediately before the rear wheel differential device is transmitted via the transmission shaft 12 to the front wheel differential device 11 and then to the right and left front wheels 1.

(Configuration of Driving Section)

As shown in FIGS. 1, 2, 3 and 4, there are provided a driver's seat 13 (corresponding to a "seat") on the left side and an auxiliary seat 14 (corresponding to the "seat") on the right side. The driver's seat 13 and the auxiliary seat 14 include their seat portions 13a, 14a and backrest portions 13b, 14b.

Figure 3:
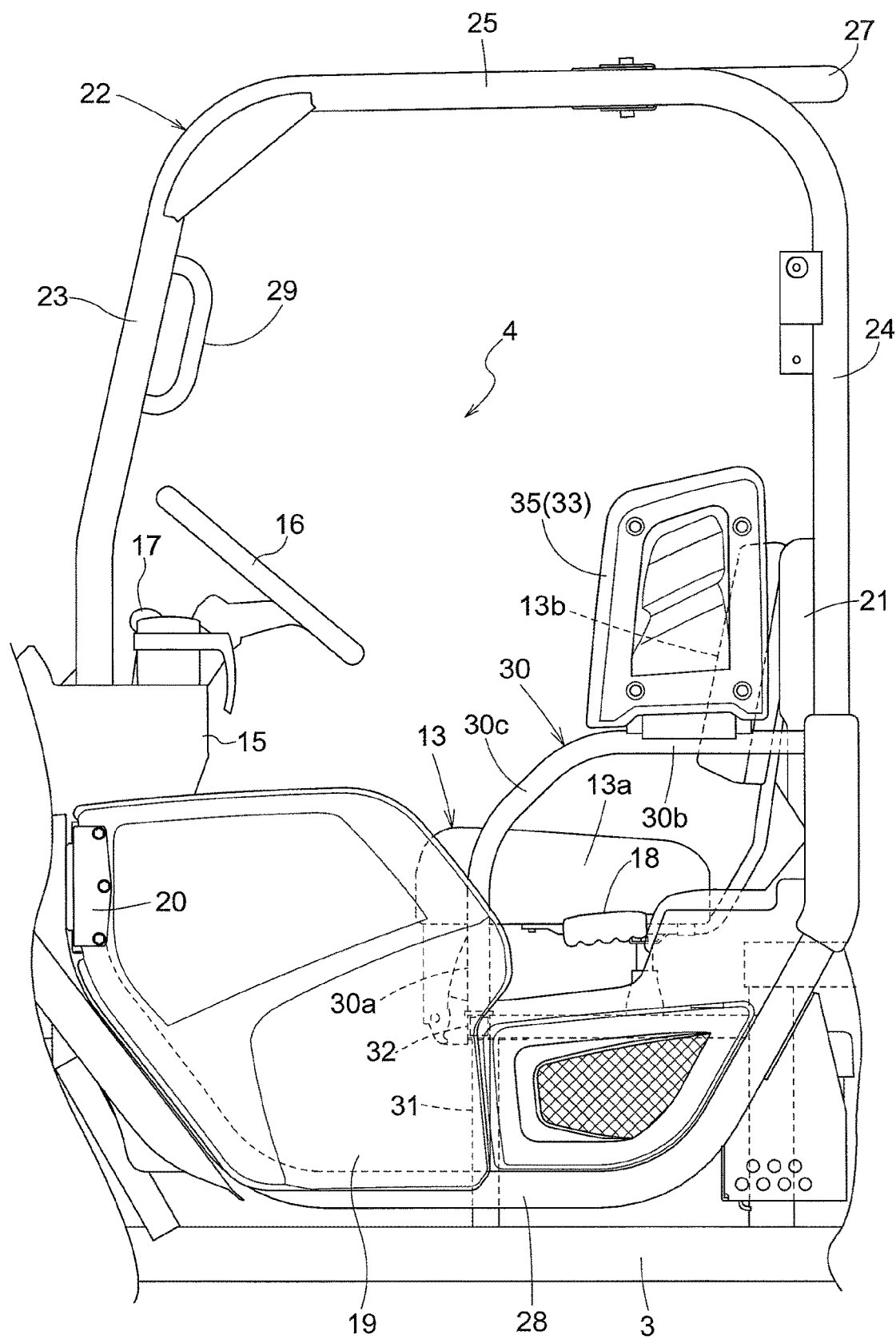
FIG. 3 is a side view showing vicinity of a driving section.

As shown in FIGS. 1, 2 and 3, in a diving panel 15 provided forwardly of the driver's seat 13, there are provided a steering wheel 16 for steering the front wheels 1 and a speed changer lever 17 for operating the gear speed changer device of the transmission case 10. Downwardly of the front side of the driver's seat 13, there is provided a speed changer pedal (not shown). The speed changer pedal, the engine 8 and the stepless speed changer device 9 are mechanically connected to each other, so that in response to a stepping-on operation on the speed changer pedal, an accelerator portion of the engine 8 is operated to a higher speed side and the stepless speed changer device 9 is operated to the higher speed side.

As shown in FIGS. 1, 2 and 3, on a left lateral outer side of the seat portion 13a of the driver's seat 13, a parking brake lever 18 for operating a parking brake (not shown) is provided.

At a right portion and a left portion at the lower portion of the driving section 4, right and left doors 19 are provided, respectively. Via a hinge 20 connected to a front portion of each door 19, the door 19 can be opened/closed about a front portion of the door 19 as its pivot.

Rearwardly of the driver's seat 13 and the auxiliary seat 14, there is provided a partitioning plate 21 for partitioning the driver's seat 13, the auxiliary seat 14 and the platform 7 from each other.

As shown FIGS. 1, 2, 3 and 4, a rollover protection structure frame (to be referred to as "ROPS frame 22" hereinafter) is connected to the vehicle body frame 3 and is provided in the driving section 4 so as to surround the driver's seat 13 and the auxiliary seat 14.

As shown in FIGS. 1, 2, 3 and 4, the ROPS frame 22 include: right and left front struts 23; right and left rear struts 24; right and left lateral frames 25 connected to/between upper portions of the front struts 23 and upper portions of the rear struts 24; right and left lower frames 28 connected to/between lower portions of the front struts 23 and lower portions of the rear struts 24, and disposed in a front/rear direction; a front frame 26 connected to/between front portions of the right and left lateral frames 25; a rear frame 27 connected to/between rear portions of the right and left lateral frames 25.

Figure 4:
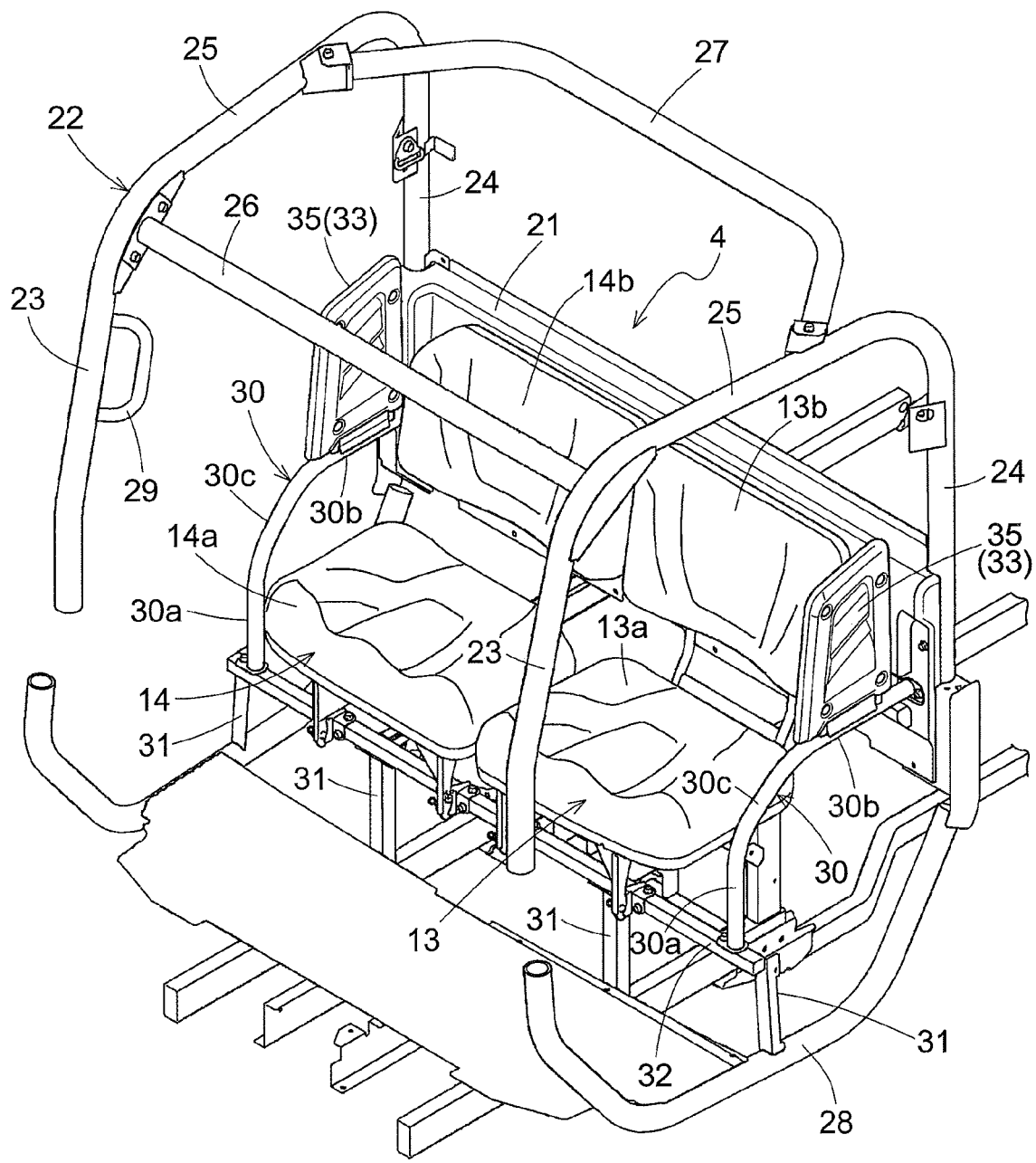
FIG. 4 is a perspective view showing vicinity of the driving section.

As shown in FIGS. 1, 3 and 4, a grip portion 29 to be gripped by a passenger to be seated at the auxiliary seat 14 is provided in the right front strut 23. The partitioning plate 21 mentioned above is attached to/between the right and left rear struts 24.

As shown in FIGS. 1, 2, 3 and 4, the right front strut 23 is disposed on the right outer side on the front side of the seat portion 14a of the auxiliary seat 14; and the left front strut 23 is disposed on the left outer side of the seat portion 13a of the driver's seat 13. The right rear strut 24 is disposed on the right outer side on the rear side of the backrest portion 14b of the auxiliary seat 14; and the left rear strut 24 is disposed on the left outer side on the rear side of the backrest portion 13b of the driver's seat 13.

(Handrail Frame)

As shown in FIGS. 1, 3 and 4, handrail frames 30 are provided on the left outer side of the driver's seat 13 and on the right outer side of the auxiliary seat 14, in the vicinity of the front sides of the rear struts 24 of the ROPS frame 22.

As shown in FIGS. 1, 3 and 4, each handrail frame 30 is formed by bending a pipe member. The handrail frame 30 includes a vertically oriented portion 30a on the front side and extending along the vertical direction, a horizontally oriented portion 30b on the rear side and extending along the horizontal direction, and an oblique portion 30c extending between the vertically oriented portion 30a and the horizontally oriented portion 30b.

As shown in FIG. 3 and FIG. 4, the vertically oriented support frames 31 are connected to the vehicle body frame 3 and the lower frames 28, respectively; and a horizontally oriented support frame 32 is connected to/between upper portions of the right and left support frames 31. Front portions of the driver's seat 13 and the auxiliary seat 14 are supported by the support frame 32.

As shown in FIG. 3 and FIG. 4, at a left portion of the driving section 4, a lower portion of the vertically oriented portion 30a of the handrail frame 30 is connected to the support frame 32; and a rear portion of the horizontally oriented portion 30b of the handrail frame 30 is connected to the left rear strut 24.

With the above arrangement, the vertically oriented portion 30a of the handrail frame 30 is located on the left outer side of the seat portion 13a of the driver's seat 13; and the horizontally oriented portion 30b of the handrail frame 30 is located on the left outer side of the backrest portion 13b of the driver's seat 13.

As shown in FIG. 4, at a right portion of the driving section 4, a lower portion of the vertically oriented portion 30a of the handrail frame 30 is connected to the support frame 32; and a rear portion of the horizontally oriented portion 30b of the handrail frame 30 is connected to the right rear strut 24.

With the above arrangement, the vertically oriented portion 30a of the handrail frame 30 is located on the right outer side of the seat portion 14a of the auxiliary seat 14; and the horizontally oriented portion 30b of the handrail frame 30 is located on the right outer side of the backrest portion 14b of the auxiliary seat 14.

(Cover Member)

Figure 5:
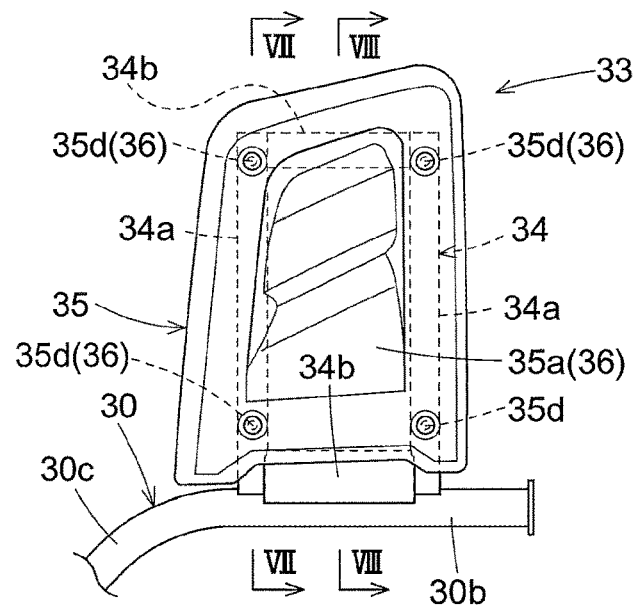
FIG. 5 is a side view showing vicinity of a cover member.
Figure 6:
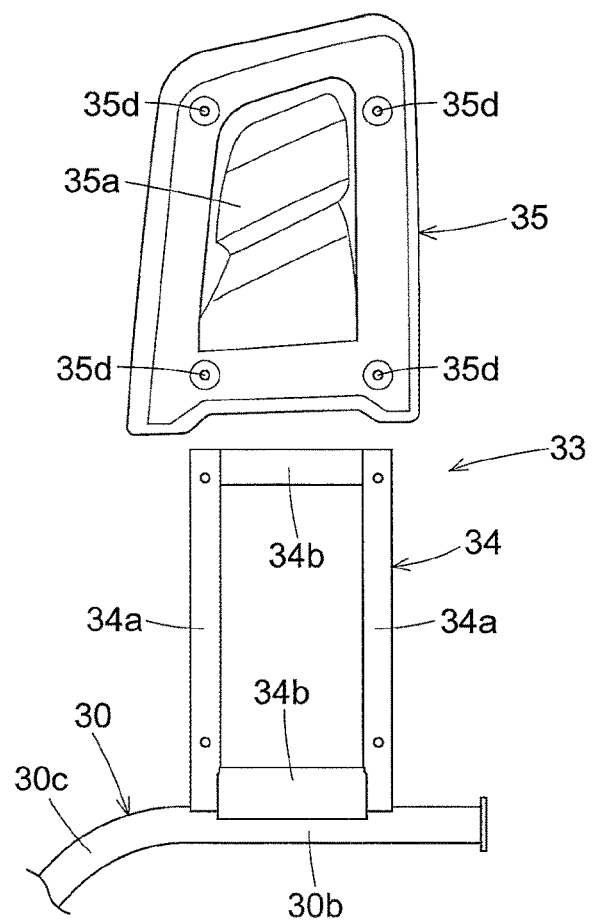
FIG. 6 is an exploded side view of the cover member.
Figure 7:
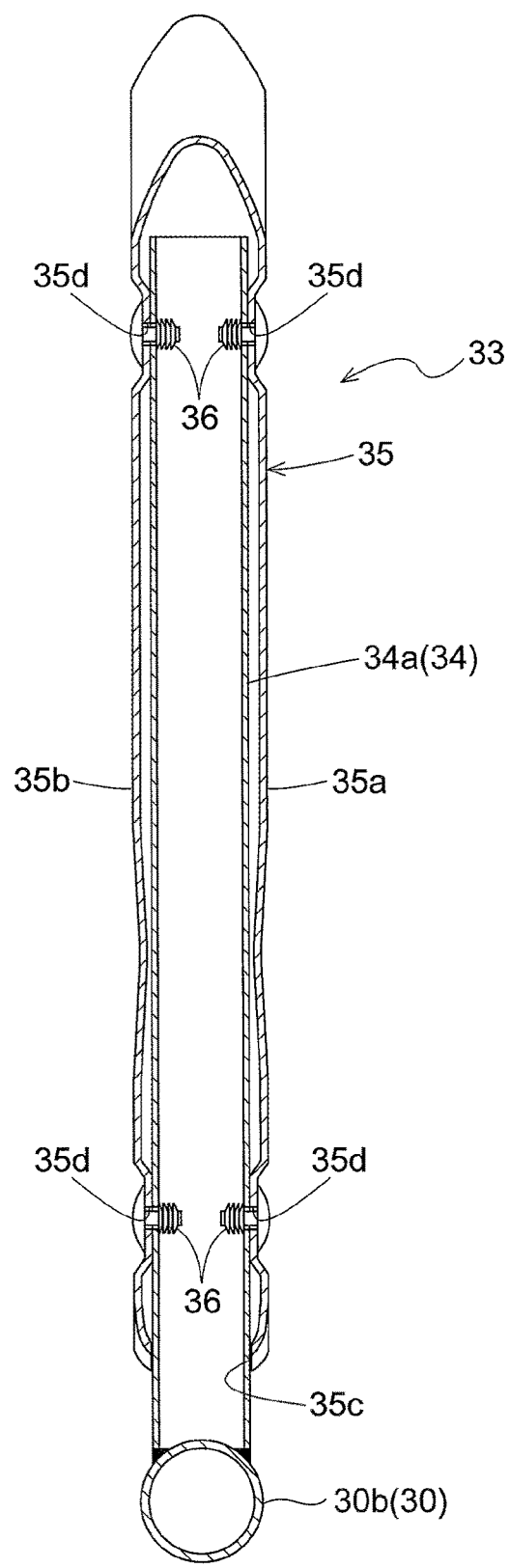
FIG. 7 is a section view taken along VII-VII direction in FIG. 5.

As shown in FIGS. 1, 2, 3 and 4, on the left outer side of the driver's seat 13 and on the right outer side of the auxiliary seat 14, right and left cover members 33 are provided, respectively. As shown in FIG. 5 and FIG. 6, each cover member 33 includes a frame portion 34 and a cover portion 35.

As shown in FIG. 5 and FIG. 6, the frame portion 34 includes front and rear vertically oriented portions 34a; and upper and lower horizontally oriented portions 34b connected to/between upper end portions and lower end portions of the front and rear vertically oriented portions 34a, respectively. The lower horizontally oriented portion 34b of the frame portion 34 is connected to the horizontally oriented portion 30b of the handrail frame 30, and the frame portion 34 extends upwards therefrom.

As shown in FIGS. 5, 6, 7 and 8, the cover portion 35 includes a first face portion 35a and a second face portion 35b which are oriented in the right-left direction when attached to the frame portion 34. The first face portion 35a and the second face portion 35b are formed integral with a predetermined spacing therebetween in the right-left direction. An opening portion 35c is formed at/between lower portions of the first face portion 35a and the second face portion 35b; each of the first face portion 35a and the second face portion 35b define connecting holes 35d at four positions.

With the above-described arrangements, as shown in FIGS. 5, 6, 7 and 8, an upper portion of the frame portion 34 is inserted into the opening portion 35c of the cover portion 35; and then the frame portion 34 enters the inside of the cover portion 35 (a space between the first face portion 35a and the second face portion 35b). Thereafter, from the outer side, pin-like connecting members 36 are inserted into the connecting holes 35d of the first face portion 35a and the second face portion 35b of the cover portion 35, thereby to connect the cover portion 35 to the frame portion 34.

With the above, as shown in FIGS. 1, 2, 3 and 4, the cover member 33 is attached to the horizontally oriented portion 30b of the handrail frame 30 and extends upwards therefrom, so that the cover members 33 are disposed on the left outer side of the driver's seat 13 and on the right outer side of the auxiliary seat 14, respectively. With reference to each cover member 33, the first face portion 35a and the second face portion 35b of the cover portion 35 are oriented in the right-left direction and the frame portion 34 is covered by the cover portion 35.

Figure 8:
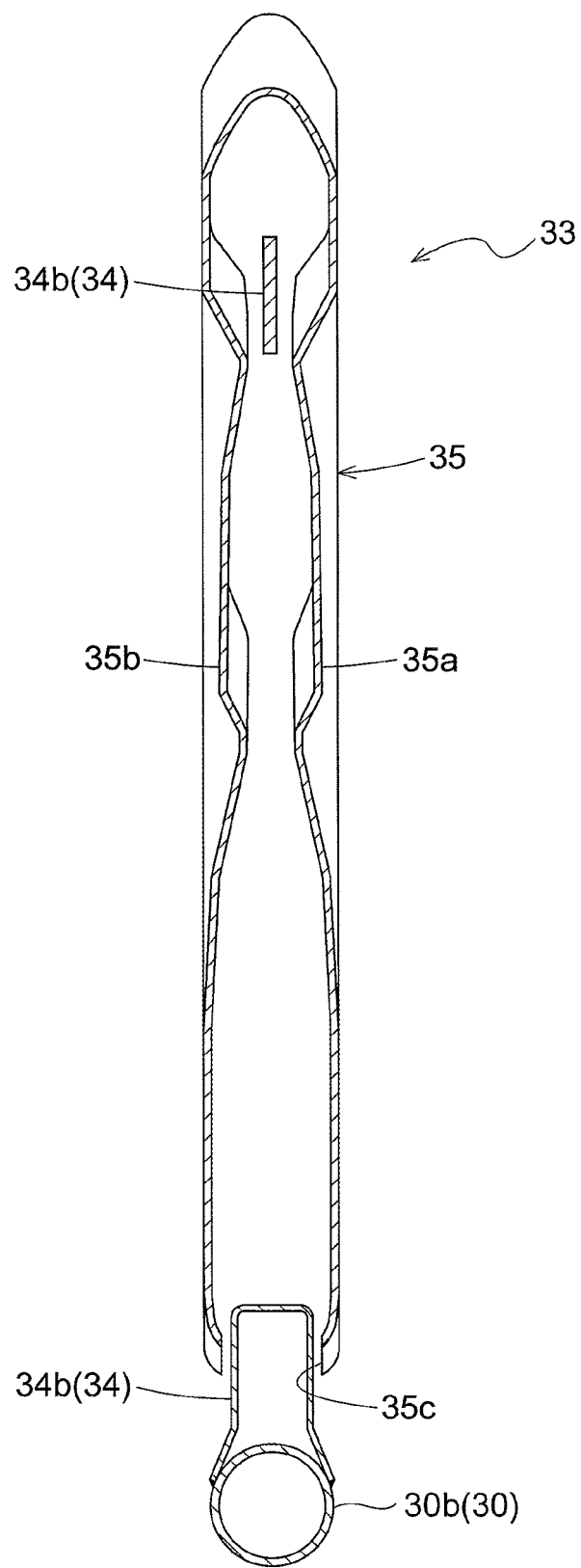
FIG. 8 is a section view taken along VIII-VIII direction in FIG. 5.

Specifically, as shown in FIG. 8, at a left portion of the driving section 4, the cover member 33 is located on the left outer side of the backrest portion 13b of the driver's seat 13 and extends upwards therefrom along the left rear strut 24 on the front side of the left rear strut 24.

At a right portion of the driving section 4, the cover member 33 is located on the right outer side of the backrest portion 14b of the auxiliary seat 14 and extends upwards therefrom along the right rear strut 24 on the front side of this right rear strut 24.

As shown in FIGS. 4, 5, 6, 7 and 8, the right and left cover members 33 (the frame portions 34 and the cover portions 35 thereof) are identical.

With the above, as shown in FIG. 8, in the cover member 33 at the left portion of the driving section 4, the first face portion 35a of the cover portion 35 is oriented toward the left outer side of the driver's seat 13, and the second face portion 35b of the cover portion 35 is oriented toward the driver's seat 13. In the cover member 33 at the right portion of the driving section 4, the first face portion 35a of the cover portion 35 is oriented toward the auxiliary seat 14 side and the second face portion 35b of the cover portion 35 is oriented toward the right outer side of the auxiliary seat 14.

Further Embodiments of First Embodiment

Next, only differences from the foregoing embodiment will be described.

(1) The cover member 33 may be attached not to the horizontally oriented portion 30b of the handrail frame 30, but to the vertically oriented portion 30b or the oblique portion 30c of the handrail frame 30 and extend upwards therefrom.

(2) The cover member 33 may be attached not only to the handrail frame 30, but also the cover member 33 may be attached to the handrail 30 at a lower portion thereof to extend upwards therefrom, and also this cover member 33 may be attached to the rear strut 24 of the ROPS frame 22 at an upper portion thereof.

(3) In each of the right and left cover members 33, the cover portion 35 may be shaped right-left symmetric as seen in a lateral side view.

With the above arrangement, when each cover portion 35 is attached to the frame portion 34 associated therewith, right/left orientations of the first face portion 35a and the second face portion 35b thereof in one of the right/left cover members 33 are reversed to those in the other of the right/left cover members 33. Then, the first face portions 35a of the cover portions 35 in the left and right cover members 33 may be oriented toward the driver's seat 13 and the auxiliary seat 14, respectively; and the second face portions 35b thereof may be oriented toward the lateral outer sides of the driver's seat 13 and the auxiliary seat 14, respectively.

Conversely, the first face portions 35a of the cover portions 35 in the left and right cover members 33 may be oriented toward the lateral outer sides of the driver's seat 13 and the auxiliary seat 14, respectively; and the second face portions 35b thereof may be oriented toward the driver's seat 13 and the auxiliary seat 14, respectively.

(4) The cover member 33 may include a single plate-like cover portion 35, instead of the cover portion 35 having the first face portion 35a and the second face portion 35b disposed with a predetermined space therebetween.

With the above arrangement, the cover portion 35 may be attached to one side of the frame portion 34 adjacent the driver's seat 13 or the auxiliary seat 14 side, so that the other side of the fame portion 34 will be exposed.

(5) The handrail frame 30 may have, in addition to the vertically oriented portion 30a on the front side that extends downward from a front end of the horizontally oriented portion 30b ("front" vertically oriented portion), a "rear" vertically oriented portion may be provided such that it extends downward from a rear front end of the horizontally oriented portion 30a, so that the handrail frame 30 may have an arch-like shape as seen in the lateral side view.

With the above arrangement, a lower portion of the "rear" vertically oriented portion 30a of the handrail frame 30 may be connected to a portion other than the ROPS frame 22.

(6) The horizontally oriented portion 30b of the handrail frame 30 may be positioned at a height approximately equal to a height of each of the seat portions 13a, 14a of the driver's seat 13 and the auxiliary seat 14, so that the cover member 33 attached to the handrail frame 30 may extend upwards from the height approximately equal to the height of each of the seat portions 13a, 14a of the driver's seat 13 and the auxiliary seat 14.

(7) Rear seat(s) (not shown) may be provided rearwardly of the driver's seat 13 and the auxiliary seat 14. In this arrangement, the handrail frames 30 and the cover members 33 may be provided not only on the lateral outer sides of the driver's seat 13 and the auxiliary seat 14, but also on lateral outer sides of the rear seat(s).

Second Embodiment (General Configuration)

Figure 9:
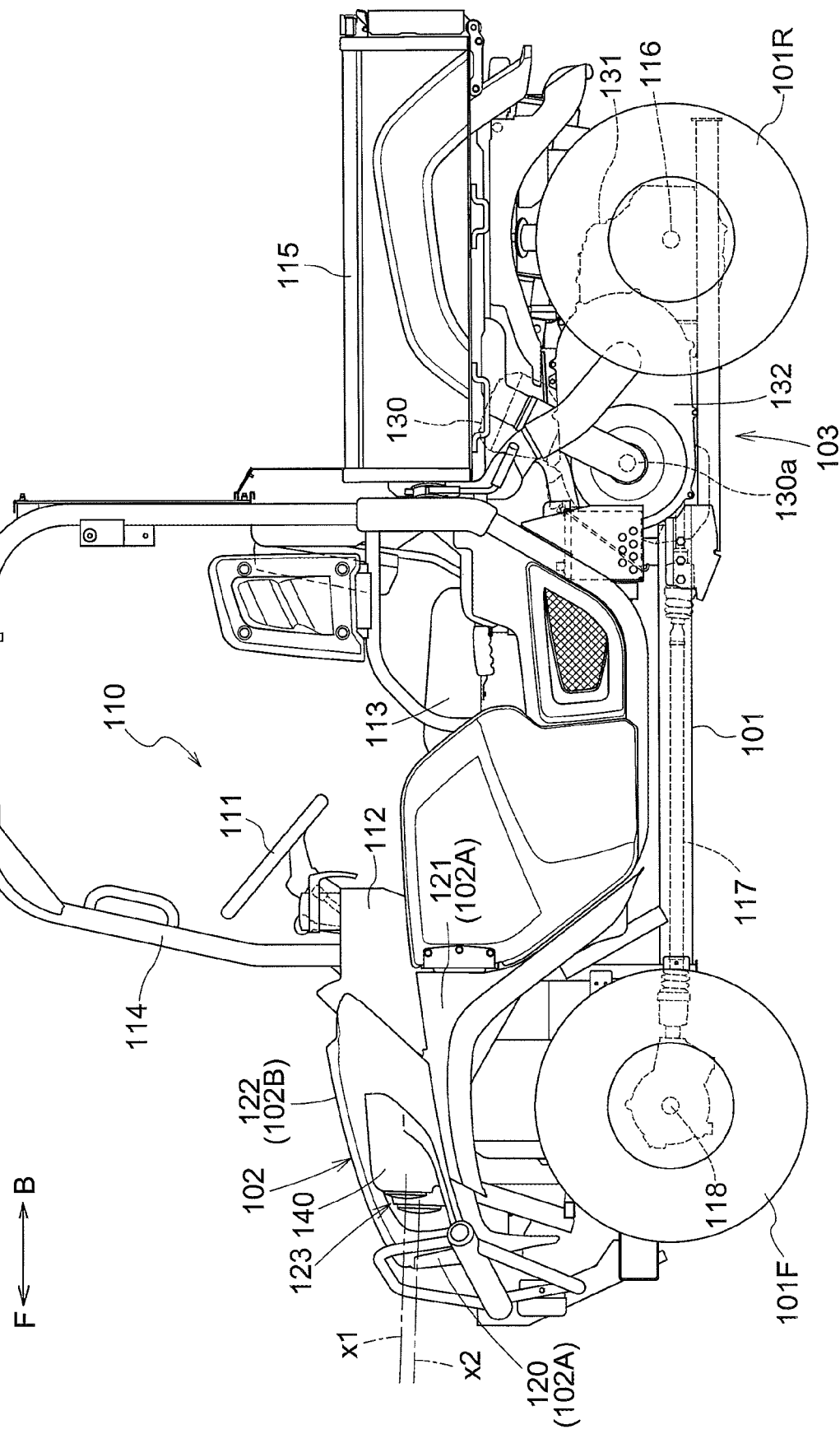
FIG. 9 is an overall side view of a multi-purpose vehicle according to a second embodiment (applied similarly to the subsequent drawings up to FIG. 16)

A multi-purpose vehicle as shown in FIG. 9 has its utility for a variety of purposes such as transport of a load, a recreational activity, etc. In the multi-purpose vehicle, a pair of right and left steerable front wheels 101F, 101F are provided at front portions of a vehicle body frame 101 which forms a framework of a traveling vehicle body; and a pair of right and left non-steerable rear wheels 101R, 101R are provided at rear portions of the vehicle body frame 101. Drive power can be transmitted to the front wheels 101F, 101F and the rear wheels 101R, 101R from a traveling output device to be described later. With these, the multi-purpose vehicle is configured as a four-wheel drive type, four-wheeled vehicle.

At intermediate portions of the traveling vehicle body in the front-rear direction, a driving section 110 is provided, including a dashboard 112 mounting maneuvering tools such as a steering wheel 111, etc.; and a driver's seat 113.

A protection frame 114 extends from a front side of the steering wheel 111 to a rear side of the driver's seat 113, surrounding this driving section 110 to cover overhead of a driver seated at the driver's seat 113 as seen in a side view.

Rearwardly of the driving section 110, there is provided a load-carrying platform 115 that effects a dumping actin about its rear end side as a pivot. Downwardly of the platform 115, there is provided an engine section 103 having e.g. a water-cooled gasoline engine (to be referred to in short as an "engine 130" hereinafter).

The engine section 103 includes the engine 130 as mentioned above, and includes also a transmission case 131 corresponding to a housing accommodating a gear speed changer mechanism, a belt type stepless speed changer mechanism 132 entrained around an output shaft 130a of the engine 130 and an input shaft (not shown) of the transmission case 131, and so on. With these, power outputted from the engine 130 is transmitted via the belt type stepless speed changer mechanism 132 to the gear type speed changer mechanism inside the transmission case 131 and speed-changed power therefrom is transmitted to the rear wheels 101R via a rear wheel drive shaft 116 (corresponding to a "power transmission shaft").

Also, power speed-changed inside the transmission case 131 is transmitted from a front portion of the transmission case 131 to a front wheel drive shaft 118 via a front wheel transmission shaft 117.

(Hood)

At a vehicle body front portion of the traveling vehicle body, there is provided a hood 102 disposed forwardly of the dashboard 112 provided at the front portion of the driving section 110.

The hood 102 includes a lower hood 102A fixed to the vehicle body frame 101 side and an upper hood 102B provided upwardly of the lower hood 102A to be pivotally openable/closable.

The lower hood 102A includes a front cover 120 which covers the front portion of the traveling vehicle body; and side covers 121, 121 which are formed continuously from right and left opposed sides of the front cover 120 and disposed on lateral portions of the traveling vehicle body.

In an inside space of the hood 102, a radiator (not shown) is mounted for cooling the engine 130 which is mounted in the engine section 103.

Figure 10:
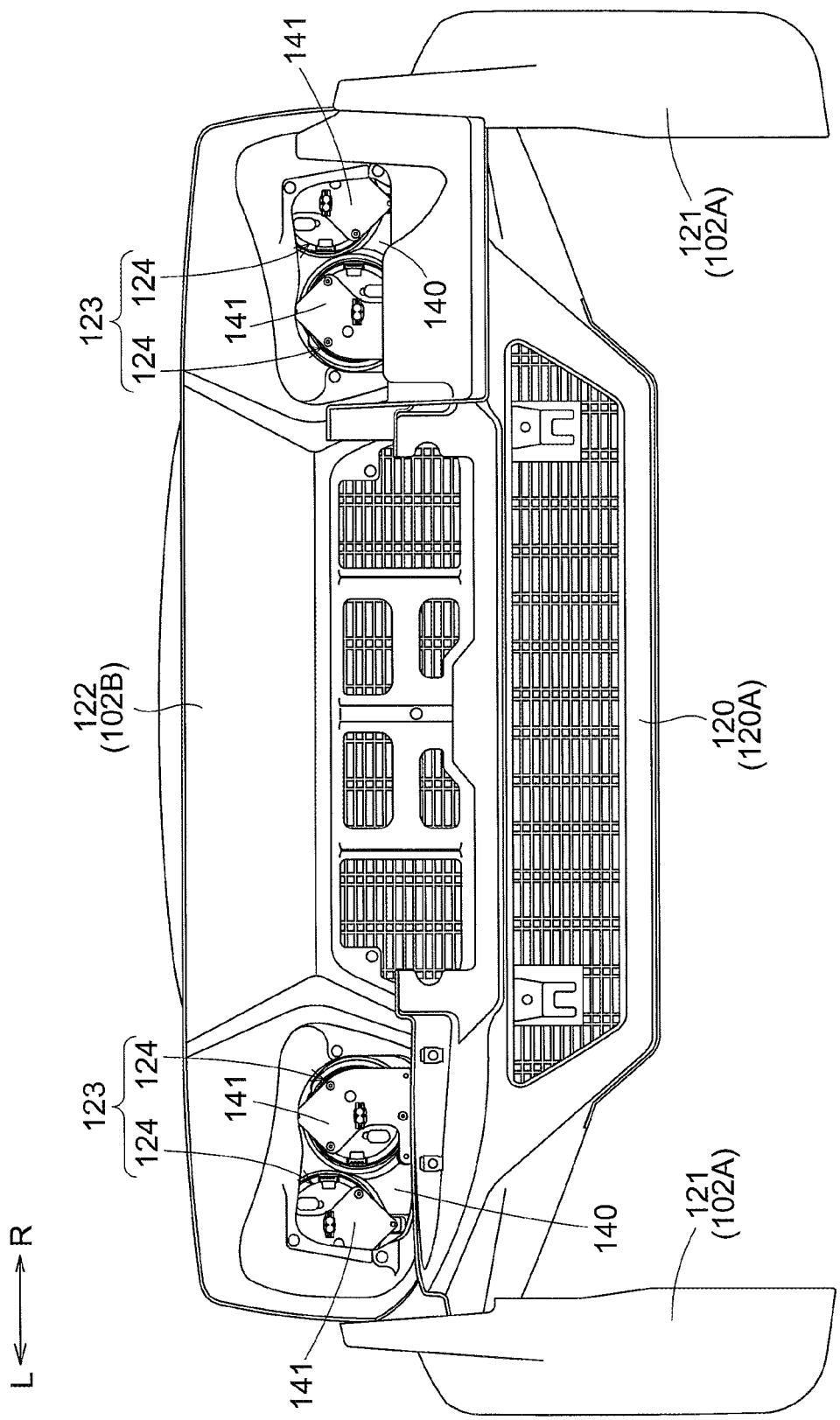
FIG. 10 is a rear view showing a front side of a hood.
Figure 11:
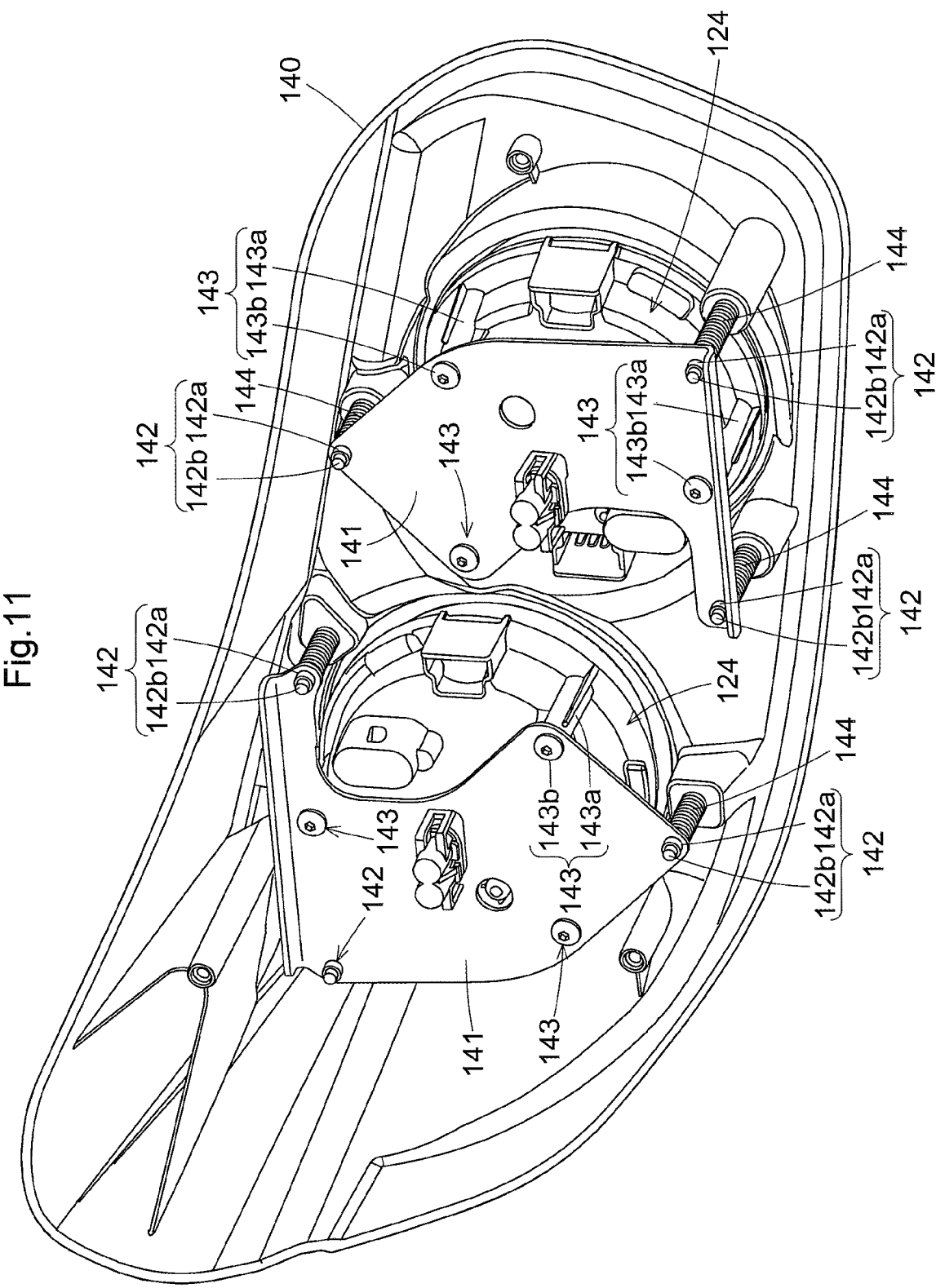
FIG. 11 is a perspective view showing a headlight and a headlight mounting apparatus.
Figure 12:
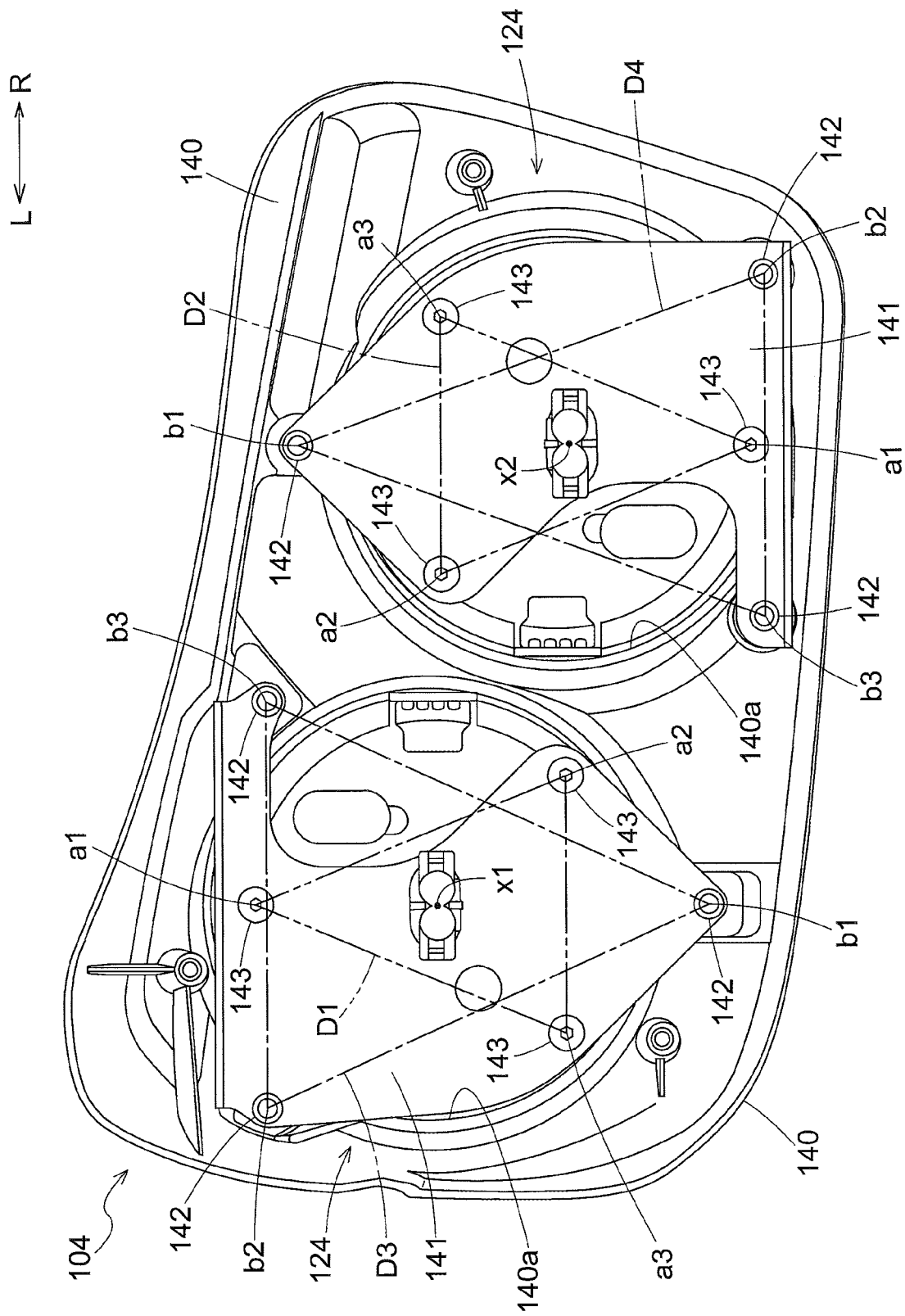
FIG. 12 is a rear view showing the headlight and the headlight mounting apparatus.

As shown in FIG. 9 and FIG. 10, at portions of the openable/closable cover 122 corresponding to the front side thereof, there are provided headlights 123 having their optical axes x1, x2 oriented to the front side when the openable/closable cover 122 assumes a closed posture.

Figure 13:
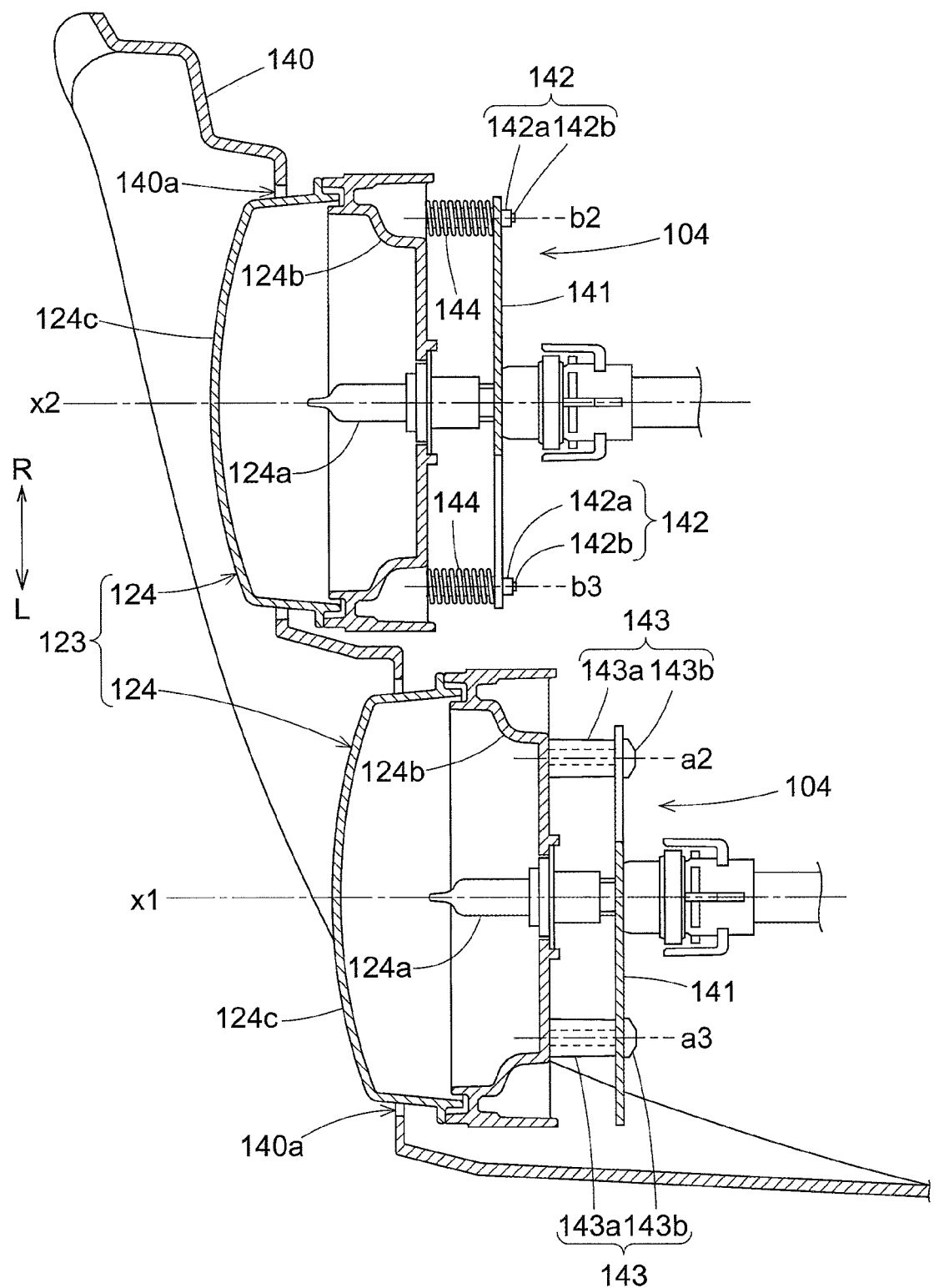
FIG. 13 is a view in horizontal section showing the headlight and the headlight mounting apparatus.
Figure 14:
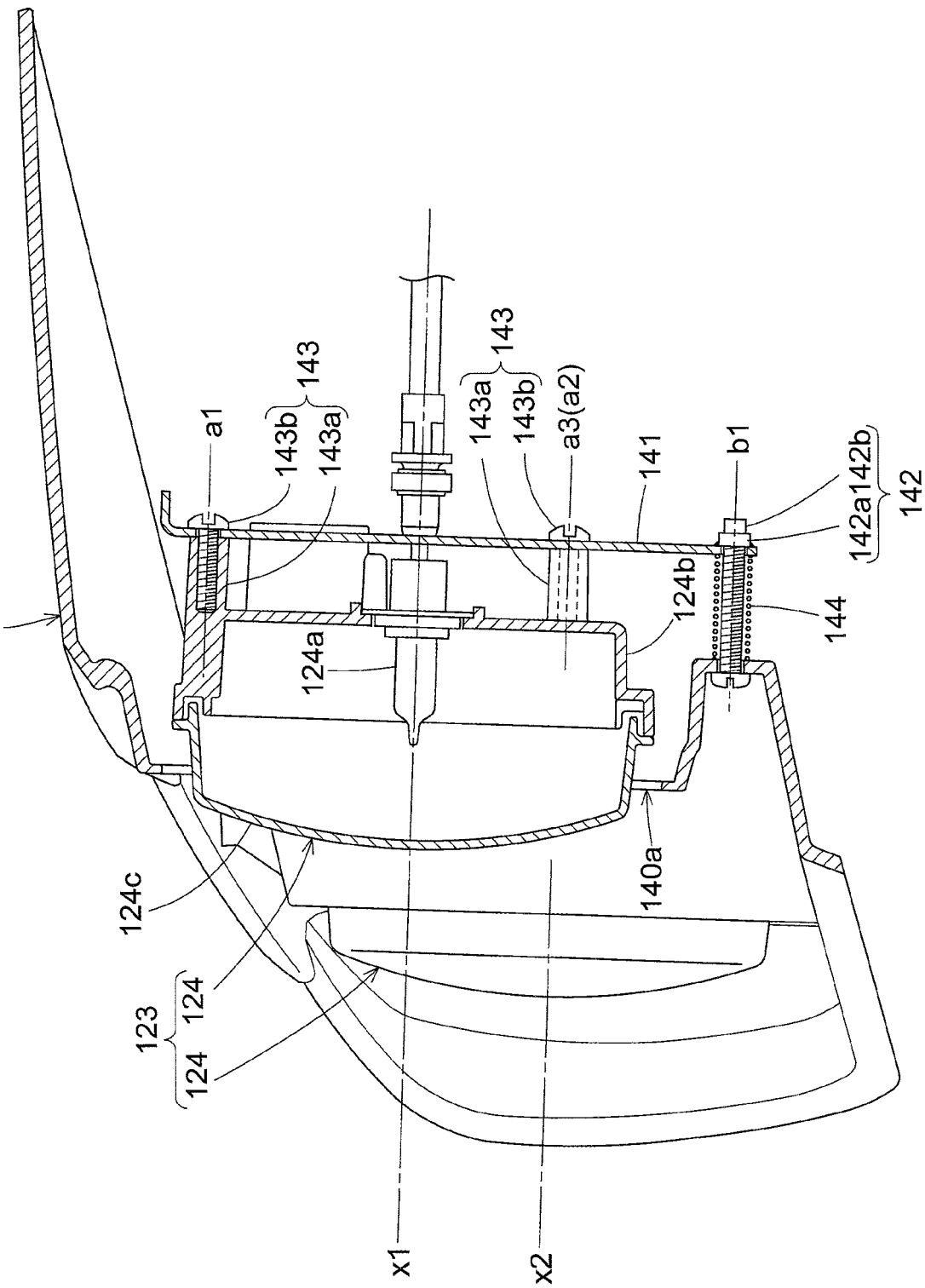
FIG. 14 is a view in vertical section showing the headlight and the headlight mounting apparatus.

Each headlight 123, as shown in FIG. 13 and FIG. 14, employs a lamp unit 124 having a bulb 124a acting as a light source, a reflector 124b and a lens portion 124c. One pair of such lamp units 124 are disposed side by side in the right-left direction to constitute a dual-lamp type headlight 123. The dual-lamp type headlight 123 is provided at each of a left side portion and a right side portion of the openable/closable cover 122 in the right-left direction. Thus, four lamp units 124 altogether are employed.

(Configuration of Headlight Mounting Apparatus)

As shown in FIGS. 10 through 14, the headlight 123 is mounted at a front portion of the hood 102 via a headlight mounting apparatus 104.

The headlight mounting apparatus 104 includes: a body member 140 provided at a front portion of the hood 102: attaching plates 141 supporting the lamp units 124 and fixable to the body member 140; fixing tools 142 for fixing the attaching plates 141 to the body member 140; and connecting tools 143 for causing the attaching plates 141 to support the lamp units 124.

The body member 140 defines a pair of right and left opening portions 140a, 140a into which the pair of right and left lamp units 124 can be inserted, respectively. Each opening portion 140a has an inside diameter thereof larger than an outside diameter of a forward circumference the cylindrical lens portion 124c of the lamp unit 124; and the lamp unit 124 is attached to the attaching plate 141 with the front portion of the lens portion 124c being inserted therein.

The pair of right and left opening portions 140a, 140a have respective centers thereof aligned with optical axes x1, x2 of the bulbs 134a acting as the light sources. In other words, the opening centers of the right and left opening portions 140a, 104a are offset from each other not only in the right-left direction, but also in the vertical direction. Specifically, the opening portion 140a disposed on the outer side of the traveling vehicle body in the lateral width direction is provided at a position higher that the opening 140a disposed on the inner side of the traveling vehicle body.

With the above-described arrangement, the largest diameter portions of the right and left opening portions 140a, 140a in the right-left direction are vertically offset from each other. As a result, in comparison with an arrangement wherein the largest diameter portions in the right-left direction are present on a same horizontal plane, the opening centers of the right and left opening portions 140a, 140 can be placed closer to each other in the right-left direction.

(Mounting of Lamp Unit to Attaching Plate)

The lamp units 124 may be attached to the respective attaching plates 141 in following manners.

With reference to FIGS. 11 through 14, the lamp unit 124 on the left side having the left-side optical axis x1 is connected to the attaching plate 141 at three connecting positions a1, a2, a3 about the optical axis x1.

In a virtual triangle D1 denoted with two-dot chain lines and interconnecting the three connecting positions a1, a2, a3, the connecting position a1 located on the upper side and immediately above the optical axis x1 forms its vertex, and a line segment connecting the connecting positions a2, a3 located on the lower side forms its bottom side, thus forming an isosceles triangle approximately.

At each connecting position a1, a2, a3, the lamp unit 124 is fixedly connected to the attaching plate 141, by means of a connecting tool 143 comprised of a female-threaded column-like portion 143a bulging rearwards from the rear face side of the reflector 124b, and a connecting bolt 143b inserted from the rear side of the attaching plate 141 and threadable with the female thread of the column-like portion 143a.

On the other hand, the lamp unit 124 on the right side having the right-side optical axis x2 is connected to the attaching plate 141 at three connecting positions a1, a2, a3 about the optical axis x2.

In a virtual triangle D2 denoted with two-dot chain lines and interconnecting these three connecting positions a1, a2, a3, the connecting position a1 located on the lower side immediately under the optical axis x1 forms a downwardly oriented vertex and a line segment connecting the connecting positions a2, a3 located on the upper side forms its bottom side, thus forming an inversely oriented isosceles triangle approximately.

At each connecting position a1, a2, a3, the lamp unit 124 is fixedly connected to the attaching plate 141, by means of a connecting tool 143 comprised of a female-threaded column-like portion 143a bulging rearwards from the rear face side of the reflector 124b, and a connecting bolt 143b inserted from the rear side of the attaching plate 141 and threadable with the female thread of the column-like portion 143a.

(Connection of Attaching Plate to Body Member)

Next the attaching plates 141 may be attached to the body member 140 in following manners.

As shown in FIGS. 11-14, the attaching plate 141 supporting the left side lamp unit 124 and having the left side optical axis x1 is connected to the body member 140 at three fixing positions b1, b2, b3 about the optical axis x1 of the lamp unit 124.

In a virtual triangle D3 denoted with one-dot chain lines and interconnecting these three fixing positions b1, b2, b3, the fixing position b1 located on the lower side almost immediately below the optical axis x1 forms a downwardly oriented vertex, and a line segment interconnecting the fixing positions b2, b3 disposed on the upper side forms the bottom side, thus forming an isosceles triangle approximately. Therefore, the virtual triangle D3 is formed with the opposite orientation to the virtual triangle D1 interconnecting the three connecting positions a1, a2, a3 of the lamp unit 124 to the attaching plate 141.

At the respective fixing position b1, b2, b3, there is provided a fixing tool 142 comprised of a stopper nut 142a fixedly welded to the rear face of the attaching plate 141, and a fixing bolt 142b that can be inserted through the body member 140 from the front side of the body member 140. By means of this fixing tool, with an engaging or disengaging operation on the fixing bolt 142b from the front side of the body member 140, connection fixing and connection releasing of the attaching plate 141 to/from the body member 140 is made possible.

Around an outer circumferential portion of the fixing bolt 142b, a coil spring 144 is fitted. The coil spring 144 is clamped under a compressed state between the body member 140 and the attaching plate 141, so that the attaching plate 141 is elastically supported by the body member 140 under the urging force of the coil spring 144.

As shown in FIGS. 11-14, the attaching plate 141 supporting the right lamp unit 124 having the right optical axis x2 is connected to the body member 140 at the three fixing positions b1, b2, b3 about the optical axis x2 of the lamp unit 124.

In a virtual triangle D4 denoted with one-dot chain lines and interconnecting the three fixing positions b1, b2, b3, the fixing position b1 located on the upper side almost immediately above the optical axis x2 forms an upwardly oriented vertex and a line segment interconnecting the fixing positions b2, b3 located on the lower side forms a bottom side, thus forming an isosceles triangle approximately. Therefore, the virtual triangle D4 of the lamp unit 124 having the optical axis x2 is formed with the opposite vertical orientation to the virtual triangle D2 interconnecting the three connecting positions a1, a2, a3 to the lamp unit 124 having the same optical axis s2 relative to the attaching plate 141.

Further, the position of the fixing position b1 in the three fixing positions b1, b2, b3 about the optical axis x2 of the right lamp unit 124 (virtual triangle D4) is formed with the opposite vertical orientation to the position of the fixing position b1 in the three fixing positions b1, b2, b3 about the optical axis x1 of the left lamp unit 124 (virtual triangle D3).

Therefore, in the virtual triangle D4 of the right lamp unit 124 having the optical axis x2, the position of the fixing position b1 forming the vertex has the opposite vertical orientation also to the virtual triangle D3 interconnecting the three fixing positions b1, b2, b3 about the optical axis x1 of the left lamp unit 124.

Also, in the three fixing positions b1, b2, b3 about the optical axis x2 of the right lamp unit 124, similarly to the three fixing positions b1, b2, b3 about the optical axis x1 of the left lamp unit 124, there is provided the fixing tool 142 comprised of the stopper nut 142a fixedly welded to the rear face of the attaching plate 141 and the fixing bolt 142b that can be inserted through the body member 140 from the front side of the body member 140.

And, in this fixing tool 142 too, around the outer circumferential portion of the fixing bolt 142b, the coil spring 144 is fitted. This coil spring 144 is clamped under a compressed state between the body member 140 and the attaching plate 141.

(Definitions of Bottom Sides and the Vertices of the Virtual Triangles)

The bottom sides and the vertices of the virtual triangles D1, D2, D3, D4 about the optical axis x1 and the optical axis x2 of the lamp units 124 described above are defined as follows in the present invention.

Namely, of the respective sides of the virtual triangles D1, D2, D3, D4, relative to the line segment interconnecting the optical axis x1 and the optical axis x2 of the right and left lamp units 124, a side corresponding to the line segment parallel or nearly parallel thereto is defined as the bottom side, and the corner portion at the position opposed to the bottom side is defined as the vertex.

Therefore, in the foregoing embodiment, the line segment interconnecting the connecting positions a2, a3 about the optical axis x1 in the virtual triangle D1 and the line segment interconnecting the connecting positions a2, a3 about the optical axis x2 in the virtual triangle D2 are the bottom sides, respectively; and the connecting position a1 about the optical axis x1 in the virtual triangle D1 and the connecting position a1 about the optical axis x2 in the virtual triangle D2 are the vertices, respectively.

Similarly, the line segment interconnecting the fixing positions b2, b3 about the optical axis x1 of the virtual triangle D3 and the line segment interconnecting the fixing positions b2, b3 about the optical axis x2 of the virtual triangle D4 are the bottom sides, respectively; and the fixing position b1 about the optical axis x1 in the virtual triangle D3 and the fixing position b1 about the optical axis x2 in the virtual triangle D4 are the vertices, respectively.

Though not shown, if the side corresponding to the line segment parallel to or nearly parallel to the line segment interconnecting the optical axis x1 and the optical axis x2 of the right and left lamp units 124 cannot be specified to a single side in the respective sides of the virtual triangles D1, D2, D3, D4, any one of the plurality of sides will be assumed as the bottom side and the vertex will be obtained for respective side, and respective orientations will be judged.

For example, in the case of the virtual triangle D1 when the line segment interconnecting the connecting position a1 and the connecting position a2 of the connecting portions a1, a2, a3 about one optical axis x1 is assumed to be the bottom side, the connecting position a3 will form the vertex. In this case, the line segment to form the corresponding bottom side for the other optical axis x2 will be a segment parallel to or nearly parallel to the line segment interconnecting the connecting position a1 and the connecting position a2 about the optical axis x1, namely, the line segment interconnecting the connecting position a1 and the connecting position a2 about the optical axis x2. Therefore, the vertex of this virtual triangle D2 will be the connecting position a3.

Similarly, in the case of the virtual triangle D1 when the line segment interconnecting the connecting positions a2, a3 about the optical axis x1 is the bottom side, the connecting position a1 will be the vertex. And, in the case of the virtual triangle D2 about the optical axis x2, the line segment interconnecting the connecting position a2 and the connecting position a3 will be the bottom side. Therefore, the vertex of this virtual triangle D2 will be the connecting position a1.

Further, in the case of the virtual triangle D1 when the line segment interconnecting the connecting positions a3, a1 about the optical axis x1 is the bottom side, the connecting position a2 will be the vertex. And, in the case of the virtual triangle D2 about the optical axis x2, the line segment interconnecting the connecting position a3 and the connecting position a1 will be the bottom side. Therefore, the vertex of this virtual triangle D2 will be the connecting position a2.

Regarding the fixing positions b1, b2, b3 between the body member 140 and the attaching plate 141, too, the bottom sides and the positions of the vertices of the virtual triangles D3, D4 interconnecting the three fixing positions b1, b2, b3 about the optical axes x1, x2 will be defined in the same manner as above.

For example, in the case of the virtual triangle D3 when the line segment interconnecting the fixing portions b1, b2 about the optical axis x1 is the bottom side, the fixing position b3 will be the vertex. And, in the case of the virtual triangle D4 about the optical axis x2, the line segment interconnecting the fixing positions b1 and b2 will be the bottom side. Therefore, the vertex of this virtual triangle D4 will be the fixing position b3.

Similarly, in the case of the virtual triangle D3 when the line segment interconnecting the fixing positions b2, b3 about the optical axis x1, the fixing position b1 will be the vertex. Further, in the virtual triangle D4 about the optical axis x2, the line segment interconnecting the fixing positions b2, b3 will be the bottom side. Therefore, the vertex of this virtual triangle D4 will be the fixing position b1.

Further, in the virtual triangle D3 in case the line segment interconnecting the fixing positions b3, b1 about the optical axis x1 is the bottom side, the fixing position b2 will be the vertex, and in the virtual triangle D4 about the optical axis x2, the line segment interconnecting the fixing positions b3, b1 will be the bottom side. Therefore, the vertex of this virtual triangle D4 will be the fixing position b2.

The headlights 123 mounted at the front portion of the hood 102 are provided on the right and left opposed sides of the hood 102 via the headlight mounting apparatus 104.

With reference to FIGS. 11-14, there was described the configurations of the headlight 123 and the headlight mounting apparatus 104 on the left side of the hood 102. The headlight 123 and the headlight mounting apparatus 104 on the right side of the hood 102 are disposed in right-left symmetry relative to a centerline (not shown) in the front-rear direction of the traveling vehicle body and are configured with right-left symmetry. Thereof, explanations of the headlight 123 and the headlight mounting apparatus 104 on the right side of the hood 102 will be omitted herein.

Further Embodiments of Second Embodiment

Next, only differences from the foregoing embodiment will be described.

(1) In the foregoing embodiment, respecting the virtual triangles D1, D2 interconnecting the connecting positions a1, a2, a3 at three positions about the optical axes x1, x2 of the lamp units 124 to the attaching plates 141 and the virtual triangles D3, D4 interconnecting the fixing positions at three positions about the optical axes x1, x2 of the attaching plates 141 relative to the body member 140, there were shown the examples in which the respective vertex thereof is located immediately below or immediately above the optical axis x1 or the optical axis x2. However, the invention is not limited thereto.

For instance, though not shown, the vertex of the virtual triangles D1, D2 or the virtual triangles D3, D4 may be located at a position about the optical axis x1, x2 with an offset from the position immediately below or immediately above the optical axis x1 or the optical axis x2.

In this case, preferably, an arrangement will be provided to maintain the relationship that between the virtual triangle D1 about the optical axis x1 and the virtual triangle D2 about the optical axis x2, orientations of the respective vertices thereof will be opposite to each other; and between the virtual triangle D3 about the optical axis x1 and the virtual triangle D4 about the optical axis x2, orientations of the respective vertices thereof will be opposite to each other.

(2) In the forgoing embodiment, as the bulbs 124*a* as the light sources of the dual lamp type headlight 123, identical ones are employed for the left side and the right side. The invention is not limited thereto.

For instance, one bulb 124*a* may be used as a main lamp whereas the other bulb 124*a* may have a different function such as that of a fog lamp, etc.

(3) In the foregoing embodiment, there was shown an example in which the headlights 123 are provided in the pivotally openable/closable upper hood 102B of the hood 102. The invention is not limited thereto.

For instance, the headlight 123 may be provided at a front portion of the lower hood 102A of the hood 102 which lower hood is fixed to the vehicle body frame 101 side.

(4) In the foregoing embodiment, the vehicle is configured as a multi-purpose vehicle such as a utility vehicle. The invention is not limited thereto. The vehicle to which the headlight mounting apparatus is attached may be an agricultural machine such as a tractor, a combine, etc. or a construction work machine or a variety of vehicles such as a transporter vehicle, etc.

Third Embodiment (General Configuration)

Figure 15:
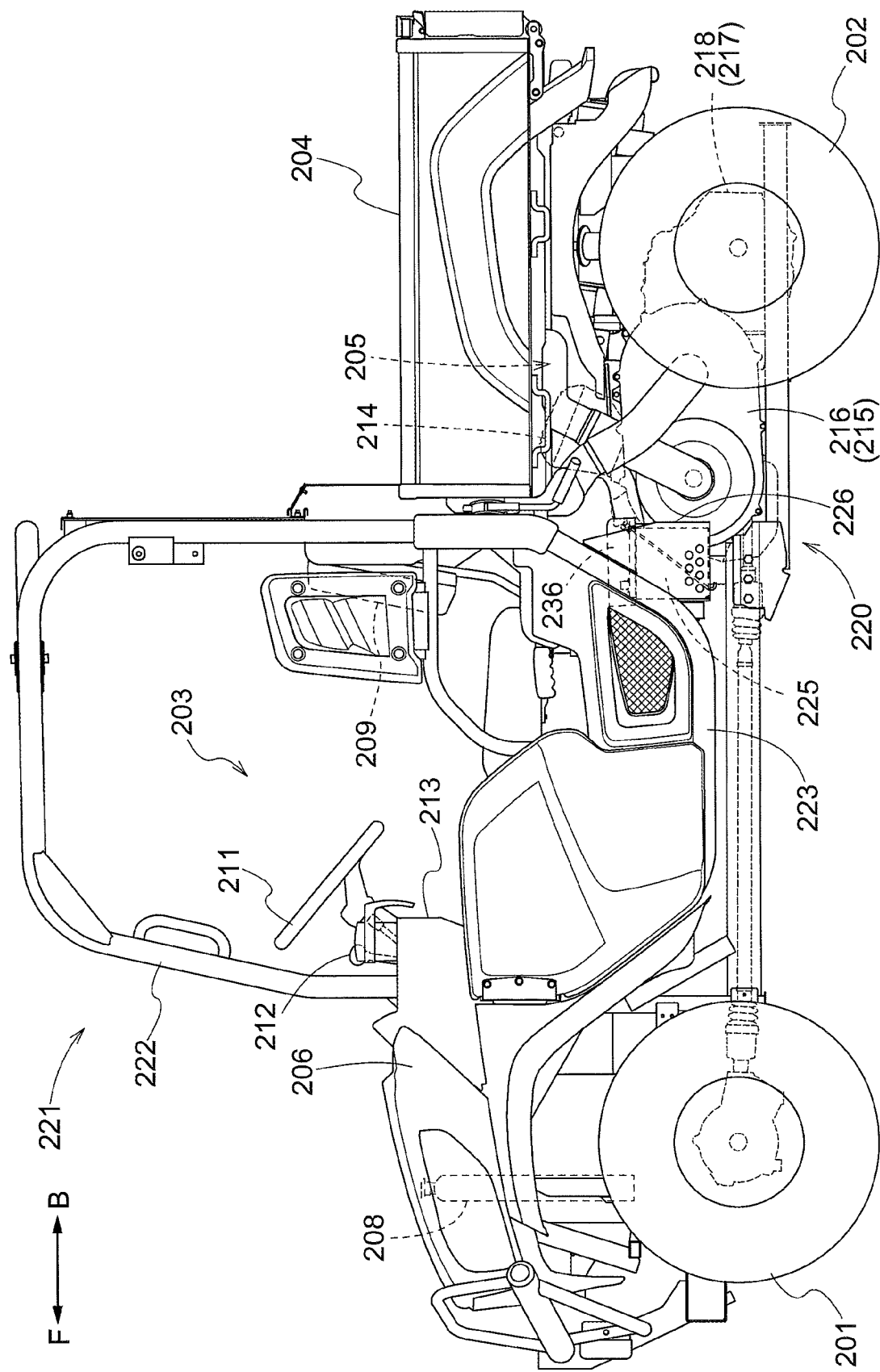
FIG. 15 is an overall side view of a multi-purpose vehicle according to a third embodiment (applied similarly to the subsequent drawings up to FIG. 22)
Figure 16:
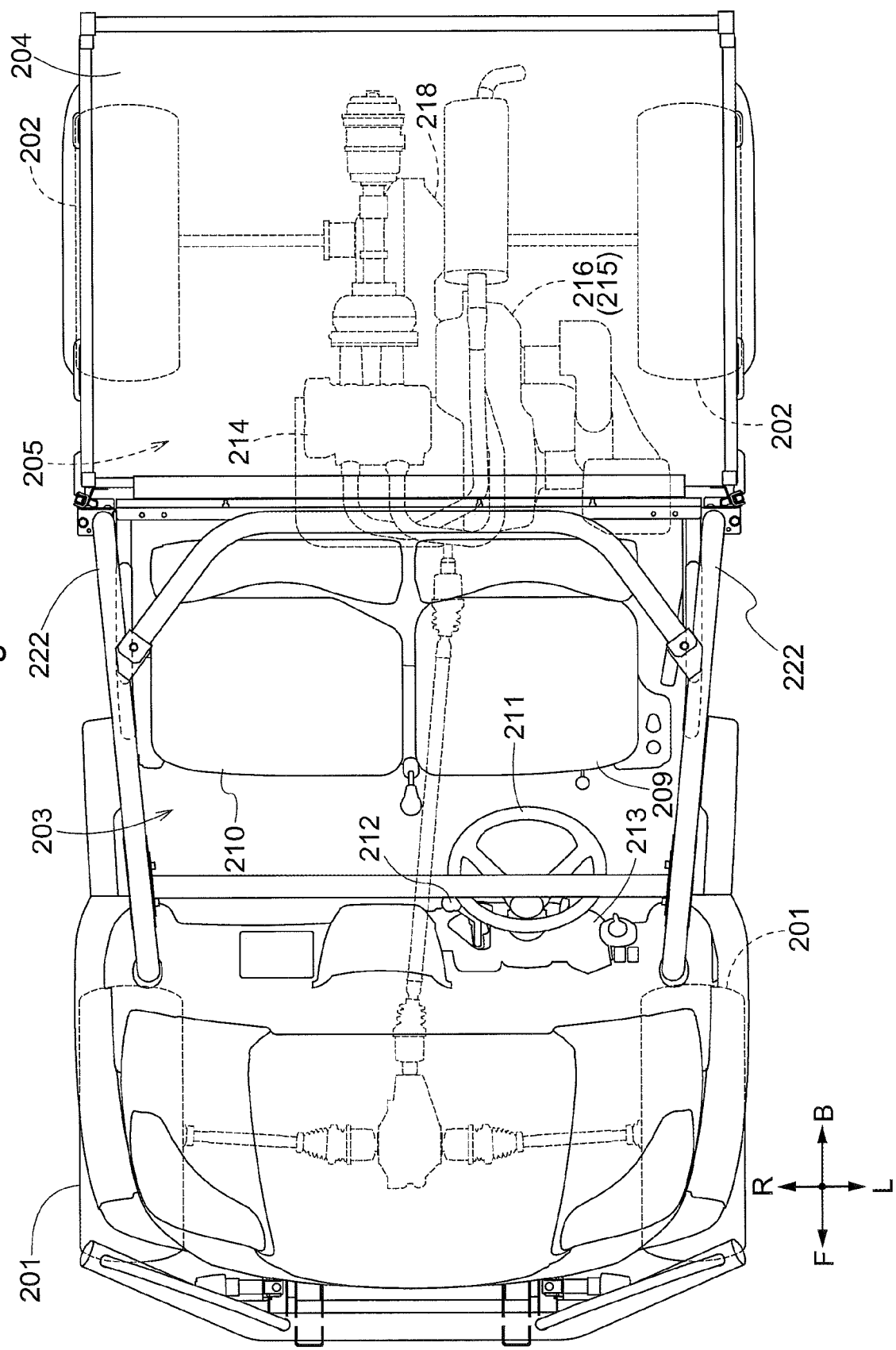
FIG. 16 is an overall plan view of the multi-purpose vehicle.

FIG. 15 and FIG. 16 show a multi-purpose vehicle as an example of a work vehicle. This multi-purpose vehicle is a vehicle for use for a variety of purposes such as load transport, a recreational activity, etc. The multi-purpose vehicle includes a pair of right and left front wheels 201 which are steerable and drivable and a pair of right and left rear wheels 202 which are drivable. At a front-rear center portion of the vehicle body, there is provided a driving section 203. Rearwardly of the driving section 203, a load carrying platform 204 is provided. Downwardly of the platform 204, an engine section 205 is provided. Forwardly of the driving section 203, there is mounted a hood 206 which can be opened/closed. In a space inside the hood 206, there are disposed a radiator 208 for cooling engine, and so on.

At the driving section 203, there are provided a driver's seat 209 at which an operator is to be seated, an auxiliary seat 210 disposed adjacent the driver's seat 209 and at which a passenger can be seated, a steering wheel 211 for effecting a steering operation, a speed changer lever 212 for effecting a speed changing operation, and so on. The steering wheel 211 and the speed changer lever 212 are disposed in a driving panel 213 disposed on the front side of the driver's seat 209.

The platform 204 is configured to be switchable between a mounting state capable of mounting a load and a dumping state capable of discharging the load. The platform 204, when pivoted about an axis oriented in the right-left direction, can be switched to the dumping state capable of discharging the load from the rear end side, with a front end side thereof being elevated. Such a posture switchover of the platform 204 can be effected by driving of a hydraulic actuator for instance.

As shown in FIG. 15 and FIG. 16, at the engine section 205, there are provided a water-cooled type gasoline engine 214 (to be referred to as the "engine 214" for short hereinafter), a speed changer case 216 accommodating a belt type stepless speed changer mechanism 215, a transmission case 218 accommodating a gear type speed changer mechanism 217, and so on.

The engine 214 has a crankshaft thereof is extending in the right-left direction and a cylinder head thereof inclined obliquely rearward. The engine 214 is configured as a two-cylinder type. The speed changer case 216 is connected to and supported by a lateral side each of the engine 214 and the transmission case 218. The transmission case 218 is connected to and supported by a rear portion side of the engine 214.

The engine 214, the transmission case 218, etc. are supported on a vehicle body frame 220. Though not detailed, the vehicle body frame 220 is provided in the form of a frame assembly consisting of a plurality of frame members extending in the front-rear direction and a plurality of frame members extending in the lateral direction.

Around the driving section 203, there is provided a protection frame 221 configured to surround the driving section 203 for its protection. The protection frame 221 includes a pair of right and left upper frames 222 having an inverted U-shape as seen in a side view, a pair of right and left lower frames 223 having a U-shape as seen in a side view, a connecting member 224 for interconnecting the upper frames 222 and the lower frames 223, and so on. Each of the upper frames 222 and the lower frames 223 is comprised of a cylindrical frame member. The protection frame 221 is connected to the vehicle body frame 220.

(Battery Supporting Arrangement)

Figure 17:
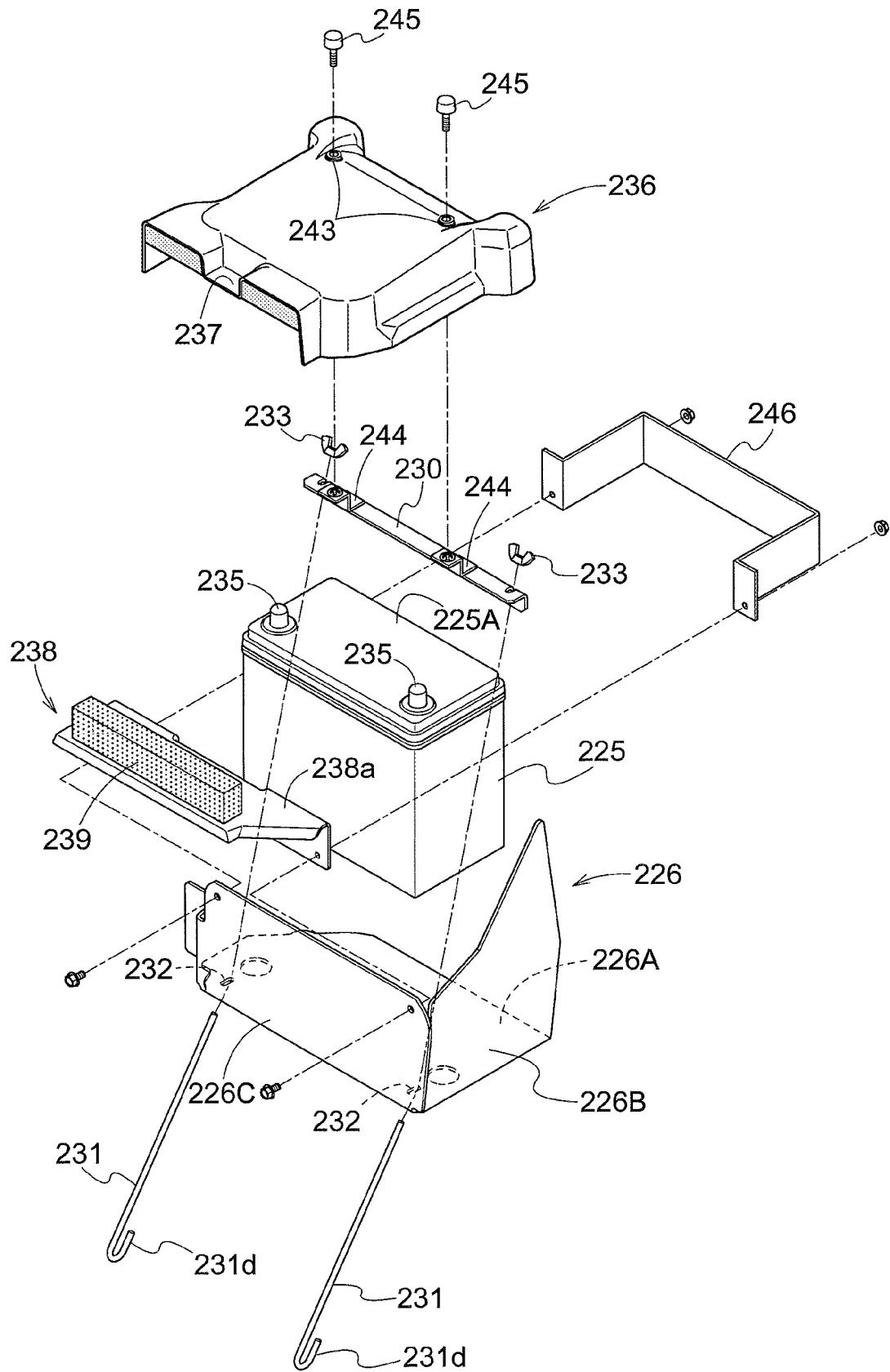
FIG. 17 is an exploded perspective view showing a battery supporting arrangement.

As shown in FIG. 15, a battery 225 is provided at a left end portion of a front-rear intermediate portion between the front wheels 201 and the rear wheels 202. The battery 225 is fixedly supported as being mounted on a support platform 226. The support platform 226 has its vehicle body inner side connected to the vehicle body frame 220 and has its vehicle body outer side connected to and supported by the lower frames 223. As shown in FIG. 17, the support platform 226 includes: a bottom face portion 226A for mounting and supporting the battery 225 thereon; a lateral wall portion 226B having an upper edge disposed under an oblique posture to be aligned with the lower frame 223 and configured to cover the left outer side of the battery 225; and a front wall portion 226C configured to cover the front side of the battery 225.

Figure 19:
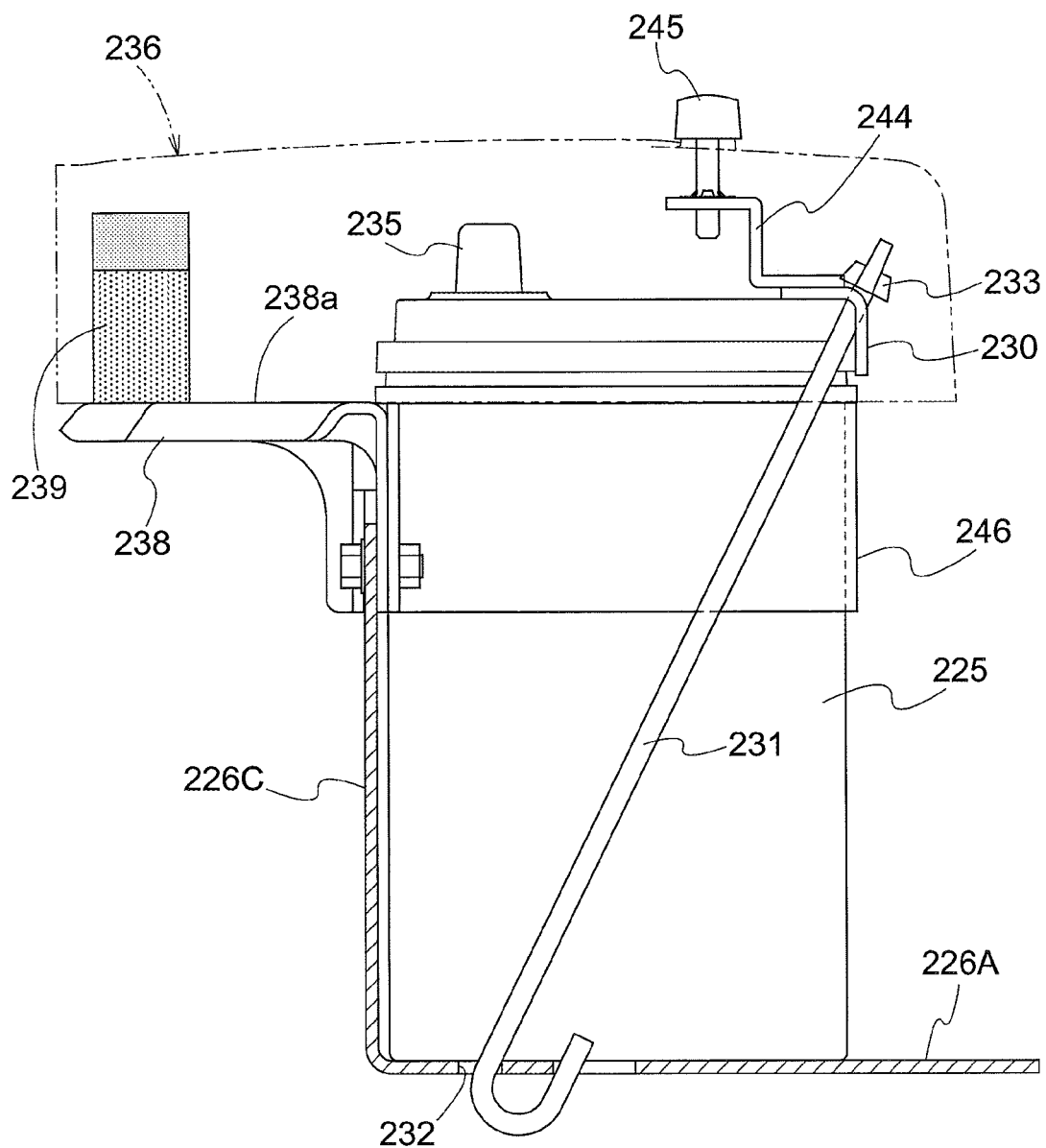
FIG. 19 is a partially cutaway side view showing the battery supporting arrangement.

As shown in FIG. 15, FIG. 17 and FIG. 19, the battery 225, as being mounted on the support platform 226, is fixed to the support platform 226 with a pressing member 230 and a pair of bar-like connecting rods 231 acting as a pair of connecting members. As shown in FIG. 17 and FIG. 19, the pressing member 230 is formed of a plate member having an L-shaped cross section and extends in the right-left direction along one rear side of the outer circumferential edge of the upper face 225A of the battery 225, and is provided under a state for applying a retention action on its corner portion from the outside. The connecting rods 231 extend along a diagonal direction between the support platform 226 and the pressing member 230, on opposed sides in the longitudinal direction of one rear side.

As retaining portions 321*d* of the connecting rods 231 formed on the support platform 226 side are hooked and retained to retained portions 232 formed in the support platform 226 and pressing member side portions of the connecting rods 231 having threads are fitted with wing nuts 233 at portions thereof inserted by the pressing member 230. Then, by fastening the wing nuts 233, the battery 225 will be clamped and pressed by the pressing member 230 and the front wall portion 226C of the support platform 226, whereby the battery 225 is fixed. When the wing nuts 233 are loosened to detach the connecting rods 231, the battery 225 can be dismounted from the support platform 226. On the upper face 225A of the battery 225, there are provided a pair of connecting terminals 235 to which cables 234 for taking off power to the outside are to be connected.

(Battery Cover)

A cover 236 is provided for covering the upper side of the upper face 225A of the battery 225. This cover 236 is configured to form a gap in cooperation with the upper face 225A of the battery 225 to secure a space for allowing passage of the cable 234 and also to seal the outer circumferential portion of the upper face 225A of the battery 225 so as to prevent intrusion of muddy water, rainwater, etc. to the connecting terminals 235.

Figure 20:
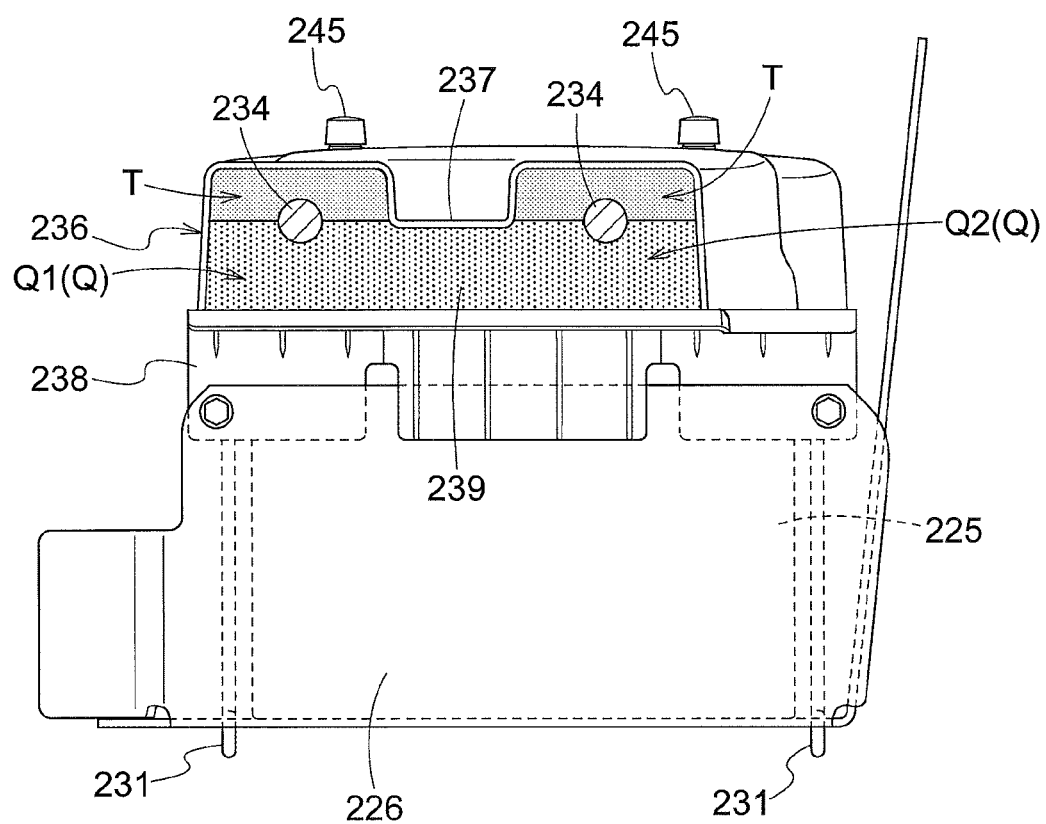
FIG. 20 is a front view showing the battery supporting arrangement.
Figure 21:
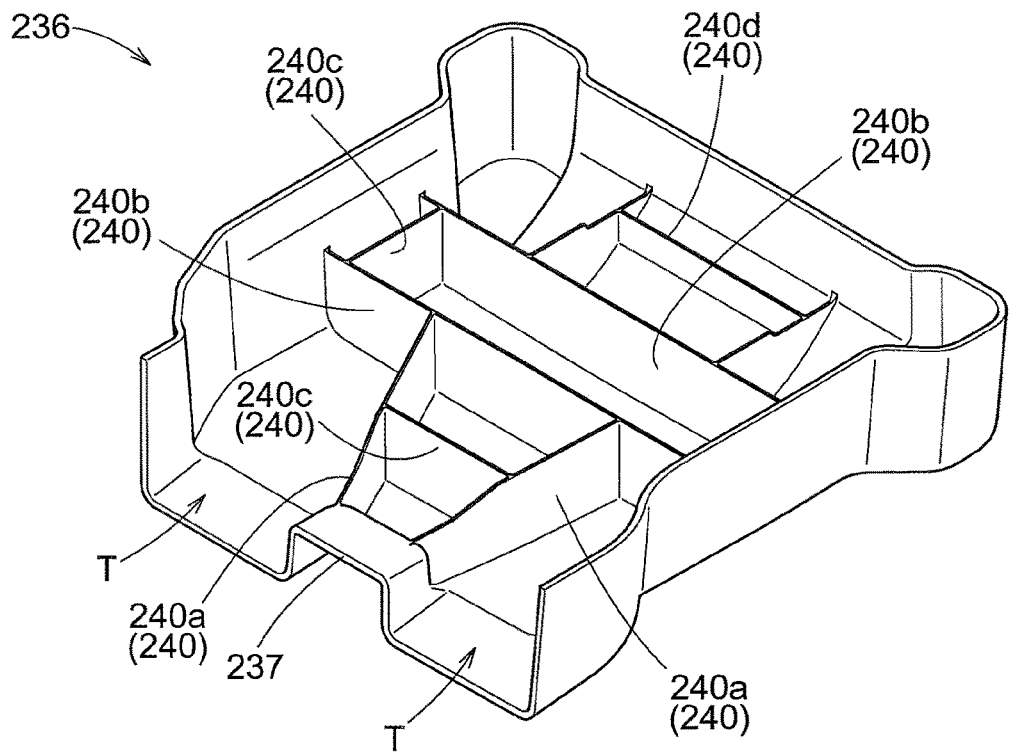
FIG. 21 is a perspective view showing a rear side of a battery cover.

Namely, as shown in FIG. 17, FIG. 20 and FIG. 21, of the outer circumference of the upper face 225A of the battery 225, the other sides thereof than one side 225A1 on the front side, namely, the right and left sides and the rear side, are configured such that vertical face portions thereof formed in the circumference of the cover 236 may respectively come into contact with the outer circumference of the upper face 225A of the battery 225, for sealing.

As shown in FIG. 20, the one side 225A1 on the front side of the outer circumference of the upper face 225A of the battery 225 is set at a cable passage portion Q where the cable 224 passes. More particularly, at front side portions of the cover 236 corresponding to the one front side, there are formed a first passage portion Q1 through which the cable 234 is to be connected to one (vehicle body right side) connecting terminal 235 (positive electrode) and a second passage portion Q2 through which the cable 234 is to be connected to the other (vehicle body left side) connecting terminal 235 (negative electrode). Between the first passage portion Q1 and the second passage portion Q2, there is formed a recessed portion 237 which fills the gap relative to the upper face 225A of the battery 225.

At a portion of the battery 225 corresponding to the front one side 225A1 thereof, there is provided a support stay 238 which protrudes forwardly from the front face of the battery 225 to form a horizontal face portion continuous with the upper face thereof. The front side portion of the cover 236 is closed as being placed in opposition to a horizontal face 238a of support stay 238. At the portions of the cover 236 where the first passage portion Q1 and the second passage portion Q2 pass, an elastic member 239 made of a sponge, etc. is interposed to close these portions. At the portions where the cables 234 pass, the elastic member 239 is elastically deformed to allow passage of the cables 234. Therefore, the cable passage portion Q for passage of the cable 234 in the outer circumference of the upper face 225A is configured to prevent intrusion of water while allowing passage of the cable 234 due to the presence of the elastic member 239 therein. Incidentally, the support stay 238 is fastened and fixed with bolts to the front wall portion 226C of the support platform 226 together with a holder member 246 for holding the battery 225.

(Reinforcing Rib of Battery Cover)

On the inner face side of the cover 236, there is provided a reinforcing rib 240 configured to form a passing space T for the cable 234 in cooperation with the upper face 225A of the battery 225 and also to prevent intrusion of water toward the connecting terminals 235.

As shown in FIG. 21, in order to form the passing space T which extends from the portions where the right and left connecting terminals 235 are located to the cable passage portion Q, the reinforcing rib 240 includes a pair of right and left front-rear oriented partitioning portions 240a extending in the front-rear direction. Further, the reinforcing rib 240 includes a pair of right-left oriented partitioning portions 240b for defining a partition between the portions where the right and left connecting terminals 225 are located, and the rear side area. Still further, the reinforcing rib 240 includes a reinforcing portion 240c which interconnects the pair of right and left front-rear oriented partitioning portions 240a and the pair of right-left oriented partitioning portions 240b to each other, and a rear side reinforcing portion 240d for reinforcing a portion on more rear side than the rear side front-rear oriented partitioning portion 240a, and so on.

With the reinforcing rib 240 formed as described above, it is possible to secure the cable passage portion Q for the cable 234, while providing sufficient strength for minimizing the risk of deformation, etc. Moreover, with utilization of such reinforcing rib 240, it is also possible to prevent intrusion of water to the connecting terminals 235.

Figure 22:
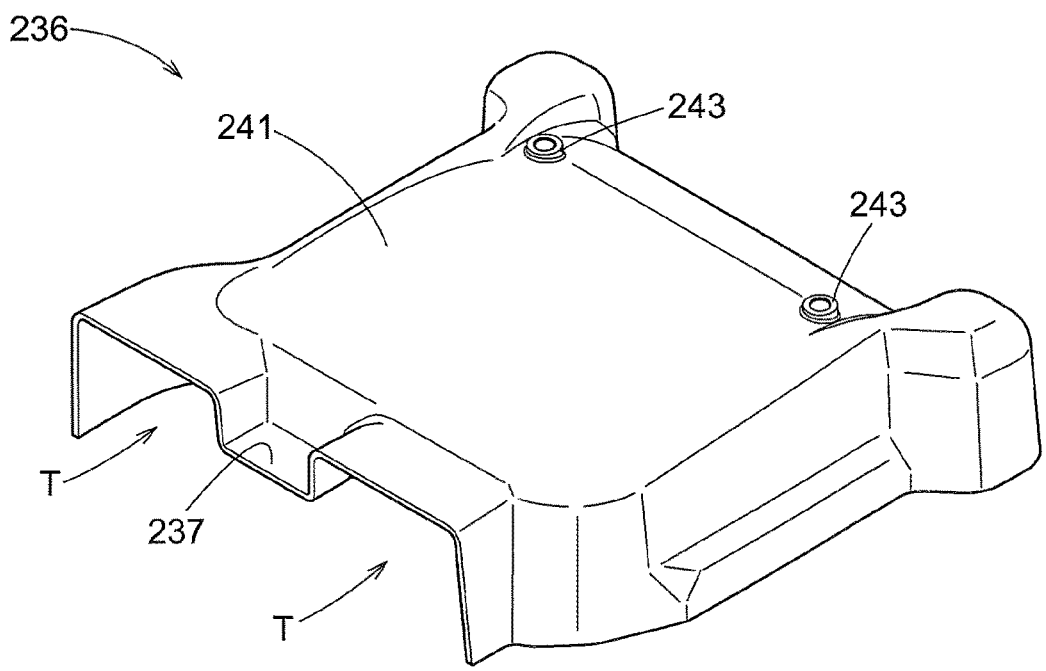
FIG. 22 is a perspective view showing a front side of the battery cover.

As shown in FIG. 22, on the upper outer face of the cover 236, there is formed an inclined face 241 which is located progressively lower toward its outer circumference side. Namely, at the rear side portion of the cover 236, the inclined face 241 is formed and configured such that one rear side of the outer circumference of the upper face 225A of the battery 225 is disposed at the lower end thereof and the inclined face 241 is inclined progressively upwards as extending from the rear one side toward the front side. The inclined face 241 is formed as a smooth curved face.

The rear side portion of the cover 236 tends to be exposed with splashing of muddy water due to such splashing of the muddy water by the rear wheels 202. Then, with formation of the inclined face 241 above, such splashed muddy water can be guided to flow down along this inclined face 241 to be discharged, so that adhesive accumulation thereof can be effectively prevented.

Figure 18:
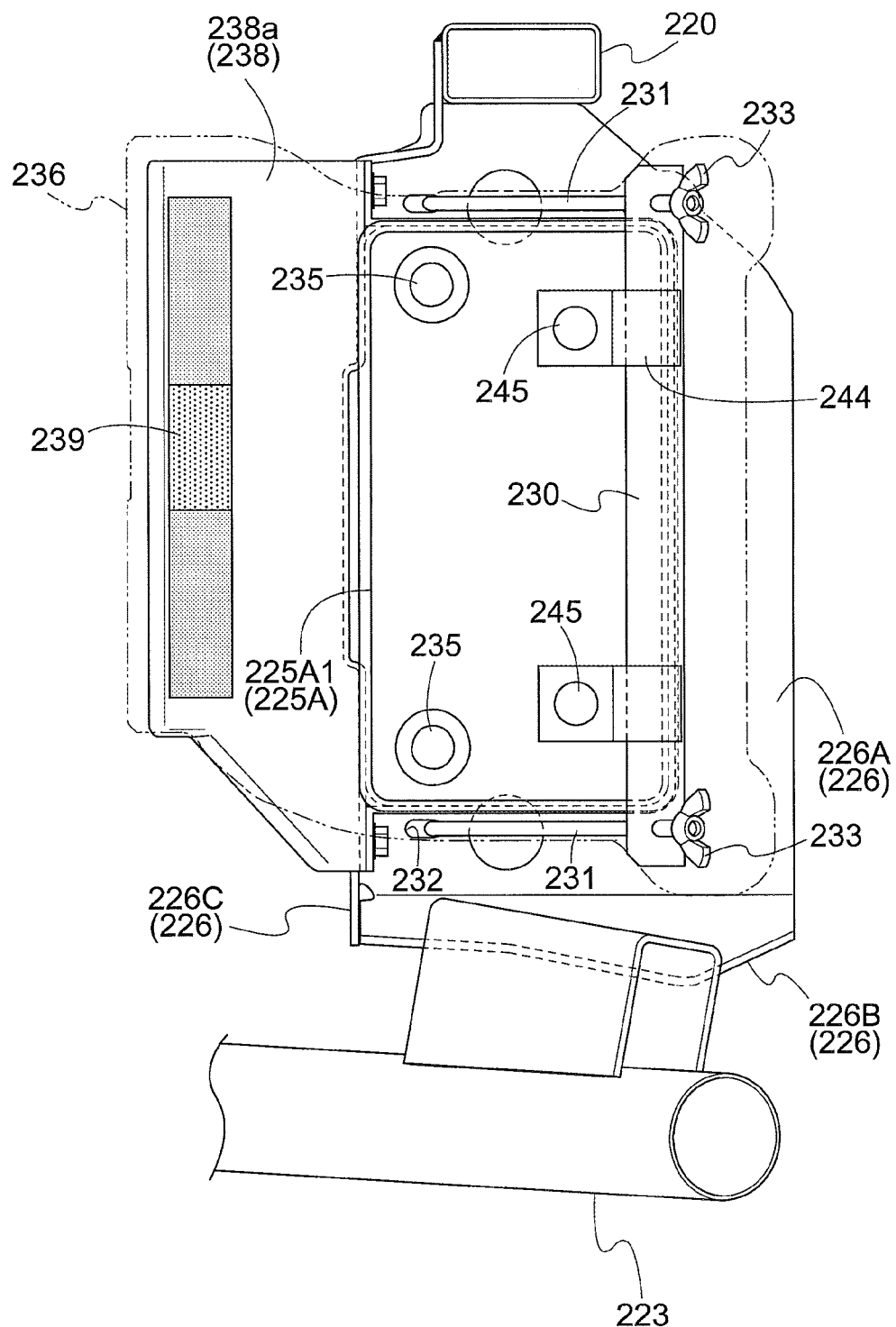
FIG. 18 is a plan view showing the battery supporting arrangement.

The cover 236 is bolt-connected to the pressing member 230 for fixing the battery 225. As shown in FIG. 22, at portions adjacent the rear side of the rear right-left oriented partitioning portion 240b, bolt insertion holes 243 are formed at positions apart from each other on the right and left opposed sides. And, as shown in FIG. 17, FIG. 18 and FIG. 19, brackets 244 are fixed to portions of the pressing member 230 associated with the respective bolt insertion holes 243. As connecting bolts 245 are inserted into/through the bolt insertion holes 243 from the upper sides thereof and then these connecting bolts 245 are fastened to the brackets 244, the cover 236 is connected to the pressing member 230.

Further Embodiments of Third Embodiment

Next, only differences from the foregoing embodiment will be described.

(1) In the foregoing embodiment, the cover 236 is connected to the pressing member 230. Instead of such an arrangement, various modified arrangements can be made, such as an arrangement in which the cover 236 is connected to the support platform 226 or an arrangement in which the cover 236 is supported on a dedicated support member (not shown) which is caused to extend from the vehicle body frame 220.

(2) In the foregoing embodiment, on the upper outer face of the cover 236, there is formed the inclined face 241 which is located progressively lower toward its outer circumference side. Instead thereof, the upper outer face entirely may be formed as a planar face.

(3) In the foregoing embodiment, the gasoline engine 214 is provided as the power source. Instead thereof, the engine and a traveling electric motor can be used in combination or the electric motor alone may be used.

(4) In the foregoing embodiment, the driving section is configured to allowing seating of two persons. Instead, it may be configured to allow seating of three or more persons.

What is claimed is:

1. A multi-purpose vehicle comprising:
   front wheels and rear wheels;
   a seat provided between the front wheels and the rear wheels;
   a platform provided rearwardly of the seat;
   a rollover protection structure frame (ROPS frame) associated with the seat, the ROPS frame including right and left front struts, and right and left rear struts;
   a handrail frame provided on a lateral outer side of the seat; and
   a cover member attached to the handrail frame and extending upwards from the handrail frame,
   wherein the cover member includes a frame portion connected to the handrail frame and extending upwards from the handrail frame, and a cover portion having a first face portion and a second face portion that are oriented along a right-left direction and spaced apart from each other via a predetermined distance in the right-left direction; and
   the cover portion is attached to the frame portion with insertion of the frame portion between the first face portion and the second face portion.

2. The multi-purpose vehicle according to claim 1, wherein:
   the handrail frame includes a vertically oriented portion extending along a vertical direction, and a horizontally oriented portion extending along a front-rear direction; and
   the cover member is attached to the horizontally oriented portion and extends upwards from the horizontally oriented portion.

3. The multi-purpose vehicle according to claim 1, wherein:
   the handrail frame is provided adjacent a front side of one of the right and left rear struts associated therewith; and
   the cover member extends upwards from the handrail frame along said one rear strut on the front side of said one rear strut.

4. A multi-purpose vehicle comprising:
   front wheels and rear wheels;
   a seat provided between the front wheels and the rear wheels;
   a platform provided rearwardly of the seat;
   a rollover protection structure frame (ROPS frame) associated with the seat, the ROPS frame including right and left front struts, and right and left rear struts;
   a handrail frame provided on a lateral outer side of the seat; and
   a cover member attached only to the handrail frame and extending upwards from the handrail frame.

5. The multi-purpose vehicle according to claim 4, wherein:
   the handrail frame includes a vertically oriented portion extending along a vertical direction, and a horizontally oriented portion extending along a front-rear direction; and
   the cover member is attached to the horizontally oriented portion and extends upwards from the horizontally oriented portion.

6. The multi-purpose vehicle according to claim 4, wherein:
   the cover member includes a frame portion connected to the handrail frame and extending upwards from the handrail frame, and a cover portion having a first face portion and a second face portion that are oriented along a right-left direction and spaced apart from each other via a predetermined distance in the right-left direction; and
   the cover portion is attached to the frame portion with insertion of the frame portion between the first face portion and the second face portion.

7. The multi-purpose vehicle according to claim 4, wherein:
   the handrail frame is provided adjacent a front side of one of the right and left rear struts associated therewith; and
   the cover member extends upwards from the handrail frame along said one rear strut on the front side of said one rear strut.

* * * * *